US008862966B2

(12) United States Patent
Nygren et al.

(10) Patent No.: US 8,862,966 B2
(45) Date of Patent: Oct. 14, 2014

(54) ADJUSTMENT OF WRITE TIMING BASED ON ERROR DETECTION TECHNIQUES

(75) Inventors: Aaron John Nygren, San Francisco, CA (US); Ming-Ju Edward Lee, San Jose, CA (US); Shadi M. Barakat, San Mateo, CA (US); Xiaoling Xu, Cupertino, CA (US); Toan Duc Pham, San Jose, CA (US); Warren Fritz Kruger, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 402 days.

(21) Appl. No.: 12/846,958

(22) Filed: Jul. 30, 2010

(65) Prior Publication Data

US 2011/0185256 A1    Jul. 28, 2011

Related U.S. Application Data

(60) Provisional application No. 61/240,699, filed on Sep. 9, 2009.

(51) Int. Cl.
*H03M 13/00* (2006.01)
*G06F 13/42* (2006.01)

(52) U.S. Cl.
CPC .................................. *G06F 13/4243* (2013.01)
USPC ........................................................ 714/775

(58) Field of Classification Search
USPC ................. 714/775, 42, 43; 711/167
See application file for complete search history.

(56) References Cited

U.S. PATENT DOCUMENTS

| 6,877,103 | B2 * | 4/2005 | Kuo et al. ...................... 713/500 |
| 7,000,170 | B2 * | 2/2006 | Slutz et al. ..................... 714/758 |
| 7,159,092 | B2 * | 1/2007 | Johnson et al. ............... 711/167 |
| 2006/0262613 | A1 * | 11/2006 | Braun et al. .................. 365/193 |
| 2008/0148092 | A1 | 6/2008 | Omori |
| 2010/0271092 | A1 * | 10/2010 | Zerbe et al. ................... 327/161 |
| 2011/0239084 | A1 * | 9/2011 | Abbasfar ...................... 714/758 |

FOREIGN PATENT DOCUMENTS

| JP | 2005-141725 A | 6/2005 |
| JP | 2008-152315 A | 7/2008 |
| WO | WO 2004/055682 A1 | 7/2004 |
| WO | WO 2009/055103 A2 | 4/2009 |

OTHER PUBLICATIONS

Combined International Search Report and Written Opinion, International Appln. No. PCT/US2010/048252, International Filing Date, Sep. 9, 2010, mailed Feb. 22, 2011, 10 pages.
Office Action dispatched Apr. 23, 2014, in Japanese Patent Application No. 2012-528893, Mr. Hayakawa Yuji et al., drafted Apr. 18, 2014 with English language translation.
English language abstract of Japanese Patent No. JP 2005-141725 A European Patent Office, espacenet database—Worldwide.

* cited by examiner

*Primary Examiner* — Philip Guyton
(74) *Attorney, Agent, or Firm* — Sterne, Kessler, Goldstein & Fox PLLC

(57) ABSTRACT

A method, system, and computer program product are provided for adjusting write timing in a memory device based on results of an error detection function. For instance, the method can include determining a write timing window between a signal on a data bus and a write clock signal based on the results of the error detection function. The method can also include adjusting a phase difference between the signal on the data bus and the write clock signal based on the write timing window. The memory device can recover data on the data bus based on the adjusted phase difference.

27 Claims, 18 Drawing Sheets

ADJUSTMENT OF WRITE TIMING BASED ON ERROR DETECTION TECHNIQUES

CROSS REFERENCE TO RELATED APPLICATION

This application claims the benefit of U.S. Provisional Application No. 61/240,699, filed Sep. 9, 2009, titled "Adjustment of Write Timing Based on Error Detection Techniques," which is incorporated herein by reference in its entirety.

BACKGROUND

1. Field

Embodiments of the present invention generally relate to an adjustment of write timing in a memory device. More specifically, embodiments of the present invention refer to adjusting the write timing of the memory device based on results of an error detection function.

2. Background

Data communication between a processing unit and a memory device typically involves sending data along signal paths such as, for example, wires and traces. In a memory device with a synchronous interface, the processing unit may transmit a clock signal along with the data signal to the memory device. The clock signal is used to determine when the data signal should be latched by the memory device, thus synchronizing the memory device to the processing unit. For proper data recovery, the memory device must receive the clock signal within a time period that allows the clock signal to sample the data signal (e.g., the clock signal must sample the data signal within a period of time corresponding to a data eye of the data signal). Otherwise, the memory device may not recover the correct data value.

Real-world variations, such as temperature and jitter, can cause attenuation in the transmitted data signal and clock signal from the processing unit to the memory device, thus causing a loss in data signal integrity. This can result in poor or inaccurate data recovery by the memory device. As operating frequencies in computer systems increase, a need arises to transmit data more rapidly from the processing unit to the memory device. Accordingly, the memory device not only needs to sample data at a faster rate, but also needs to sample the data at the proper time.

SUMMARY

Embodiments of the present invention include a method for adjusting write timing in a memory device. The method can include determining a write timing window between a signal on a data bus and a write clock signal based on results of an error detection function. The method can also include adjusting a phase difference between the signal on the data bus and the write clock signal based on the write timing window, where the memory device recovers the signal on the data bus based on the adjusted phase difference.

Embodiments of the present invention also include another method for adjusting write timing in a memory device. The method can include the following: receiving a first data pattern transmitted from a processing unit; performing an error detection function on a second data pattern to generate a first result, where the second data pattern can be the first data pattern received at an interface of the memory device based on a write clock signal; transmitting the first result to the processing unit; and, receiving a signal on a data bus, where a phase difference between the signal on the data bus and the write clock signal is within a write timing window, the write timing window based on a comparison between the first result and a second result from the error detection function performed on the first data pattern.

Embodiments of the present invention include a system for a system to adjust write timing in a memory device. The system can include a memory device and a processing unit coupled to the memory device. The processing unit can be configured to perform the following functions: determine a write timing window between a signal on a data bus and a write clock signal based on results of an error detection function; and, adjust a phase difference between the signal on the data bus and the write clock signal based on the write timing window, where the memory device recovers the signal on the data bus based on the adjusted phase difference.

Embodiments of the present invention also include another system for a system to adjust write timing in a memory device. The system can include a processing unit and a memory device coupled to the processing unit. The memory device can be configured to perform the following functions: receive a first data pattern transmitted from a processing unit; perform an error detection function on a second data pattern to generate a first result, wherein the second data pattern comprises the first data pattern received at an interface of the memory device based on a write clock signal; transmit the first result to the processing unit; and, receive a signal on a data bus, where a phase difference between the signal on the data bus and the write clock signal is within a write timing window, the write timing window based on a comparison between the first result and a second result from the error detection function performed on the first data pattern.

Embodiments of the present invention further include a computer program product to adjust write timing in a memory device. The computer program product includes a computer-usable medium having computer program logic recorded thereon enabling a processor to analyze software code. The computer program logic includes the following: first computer readable program code that enables a processor to determine a write timing window between a signal on a data bus and a write clock signal based on results of an error detection function; and, second computer readable program code that enables a processor to adjust a phase difference between the signal on the data bus and the write clock signal based on the write timing window, where the memory device recovers the signal on the data bus based on the adjusted phase difference.

Further features and advantages of the invention, as well as the structure and operation of various embodiments of the present invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art based on the teachings contained herein.

BRIEF DESCRIPTION OF THE DRAWINGS

The accompanying drawings, which are incorporated herein and form a part of the specification, illustrate embodiments of the present invention and, together with the description, further serve to explain the principles of the invention and to enable a person skilled in the relevant art to make and use the invention.

DETAILED DESCRIPTION

The following detailed description refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

It would be apparent to one of skill in the relevant art that the present invention, as described below, can be implemented in many different embodiments of software, hardware, firmware, and/or the entities illustrated in the figures. Thus, the operational behavior of embodiments of the present invention will be described with the understanding that modifications and variations of the embodiments are possible, given the level of detail presented herein.

Figure 1:
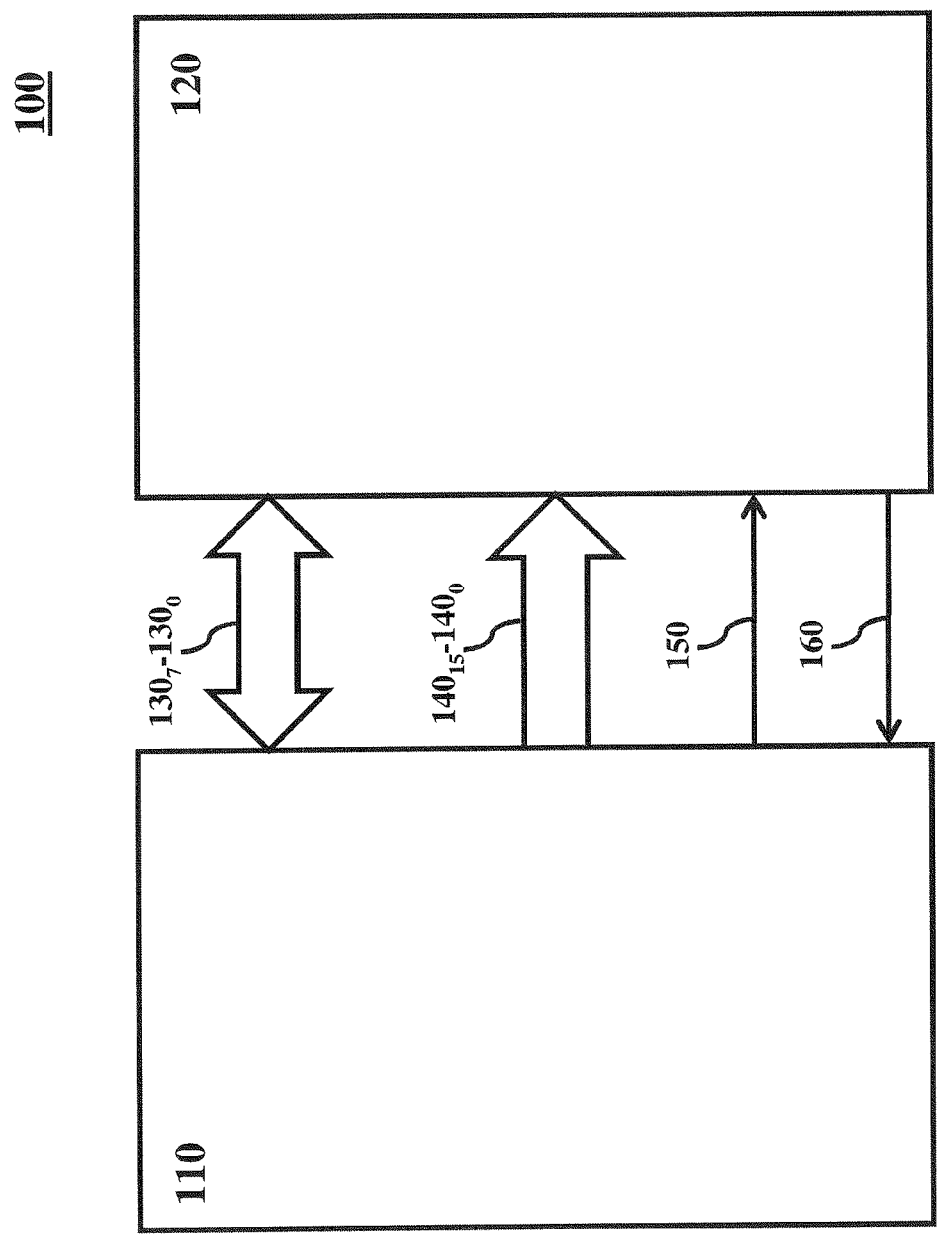
FIG. 1 is an illustration of an example computer system with a processing unit and a memory device.

FIG. 1 is an illustration of an example computer system 100 with a processing unit and a memory device. Computer system 100 includes a processing unit 110, a memory device 120, a data bus $130_7$-$130_0$, an address/control (A/C) bus $140_{15}$-$140_0$, a clock signal 150 (e.g., a write clock signal), and an error detection and correction (EDC) signal 160.

Processing unit 110 transmits address/control signals, via A/C bus $140_{15}$-$140_0$, to memory device 120. Address/control signals can include, for example, clock enable (/CKE), chip select (/CS), row address strobe (/RAS), column address strobe (/CAS), write enable (/WE), and an address bus (e.g., A[8:0]). A command decoder (not shown) in memory device 120 receives the address/control signals and, based on bit settings of the address/control signals, indicates a mode of operation for memory device 120. Modes of operation for memory device 120 can include, for example, a read operation, a write operation, an idle operation, and a refresh operation.

In a synchronous memory system, the address/control signals on A/C bus $140_{15}$-$140_0$ of FIG. 1 are timed relative to an edge of clock signal 150 (e.g., a rising edge of clock signal 150), in which the address/control signals are sampled on the edge of clock signal 150. For example purposes, A/C bus $140_{15}$-$140_0$ is illustrated as a 16-bit data bus. Based on the description herein, a person skilled in the relevant art will recognize that the bus width of A/C bus $140_{15}$-$140_0$ can vary (e.g., 8-bits, 32-bits, etc.). Address/control buses and associated signals traveling on these buses are known to those persons skilled in the relevant art.

Error detection and correction (EDC) refers to techniques to ensure that data is transmitted without errors from processing unit 110 to memory device 120. In an example, EDC signal 160 can be used to carry either parity information or error correction code between processing unit 110 and memory device 120. An error detection function generates the parity and error correction code based on data signals on data bus $130_7$-$130_0$ as known by persons skilled in the relevant art. Based on the parity information or the error correction code, processing unit 110 can determine whether data transmission to memory device 120 is without errors. In computer system 100, EDC signal 160 is a unidirectional signal that carries EDC data from memory device 120 to processing unit 110. A person of ordinary skill in the art will understand that EDC signal 160 can also be a bi-directional signal, in which EDC data is transported between processing unit 110 and memory device 120. EDC techniques and algorithms are known to those persons skilled in the relevant art.

Processing unit 110 transmits and receives data, via data bus $130_7$-$130_0$, to and from memory device 120. During a write operation, data is transferred from processing unit 110 to memory device 120 via data bus $130_7$-$130_0$. During a read operation, data is transferred from memory device 120 to processing unit 110 via data bus $130_7$-$130_0$. In a synchronous memory system, the rate at which the data is transmitted and received by processing unit 110 is based on a clock signal such as, for example, clock signal 150. For example purposes, data bus $130_7$-$130_0$ is illustrated as an 8-bit bi-directional data bus. Based on the description herein, a person skilled in the relevant art will recognize that the bus width of data bus $130_7$-$130_0$ can vary (e.g., 16-bits, 32-bits, etc.). Data buses and associated signals traveling on these buses are known to those persons skilled in the relevant art.

Memory device 120 stores data transmitted from processing unit 110. The receipt and storage of data (transmitted from processing unit 110) is known as "writing" to memory device 120. Conversely, data can be retrieved from memory device 120, which is known as "reading" from memory device 120. Memory device 120 can be configured with a synchronous interface, in which memory device 120 waits for clock signal 150 before processing the data on data bus $130_7$-$130_0$. For instance, memory device 120 can generate an internal clock signal, aligned with clock signal 150, to receive the data from data bus $130_7$-$130_0$ or to transmit the data from memory device 120 to processing unit 110 via data bus $130_7$-$130_0$. The internal clock signal of memory device 120 can be, for example, a multiple of the frequency of clock signal 150 (e.g., 2×, 4×, etc.) as understood by a person of ordinary skill in the relevant art.

Figure 2:
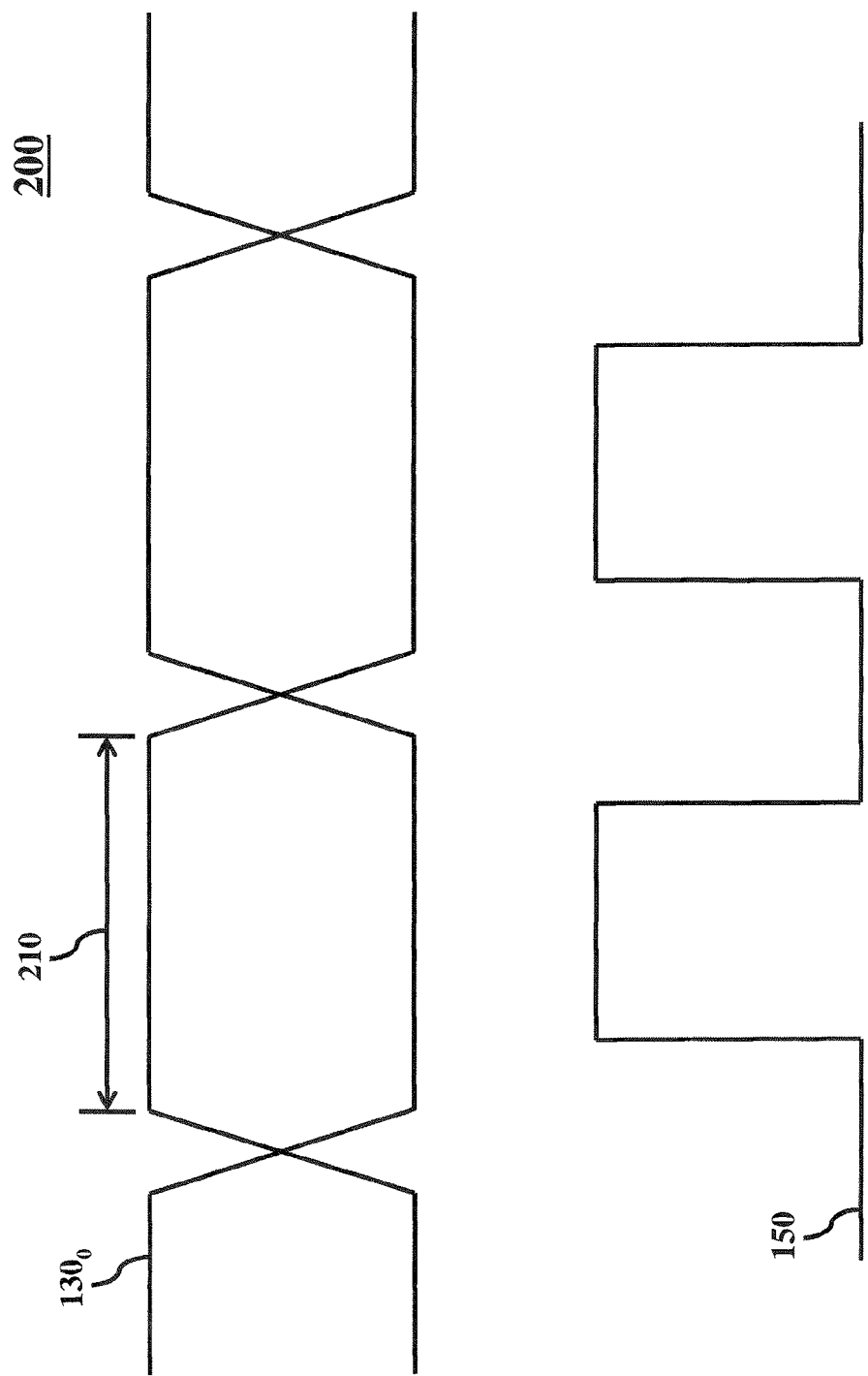
FIG. 2 is an illustration of an exemplary write timing diagram that is representative of proper data recovery by a memory device.

FIG. 2 is an illustration of an exemplary write timing diagram 200 for computer system 100 that is representative of proper data recovery by memory device 120. Write timing diagram 200 includes timings for a data eye for data signal $130_0$ and clock signal 150, where the data eye can define a period of time 210 in which clock signal 150 can be used to sample data signal $130_0$ (e.g., proper data recovery by memory device 120 can occur within period of time 210). A data eye refers to, for example, a portion of data signal $130_0$ with a valid binary value. Here, clock signal 150 is center aligned to data signal $130_0$ and samples data signal $130_0$ within the data eye when clock signal 150 is HIGH (or has a logic value of '1'). As understood by a person of ordinary skill in the relevant art, the center alignment of clock signal 150 to data signal $130_0$ provides an ideal write timing for computer system 100 since memory device 120 is allowed a sufficient period of time to receive and sample data signal $130_0$. A person of ordinary skill in the art will understand that the alignment of clock signal 150 relative to data signal $130_0$ can occur in other alignment positions.

Figure 3:
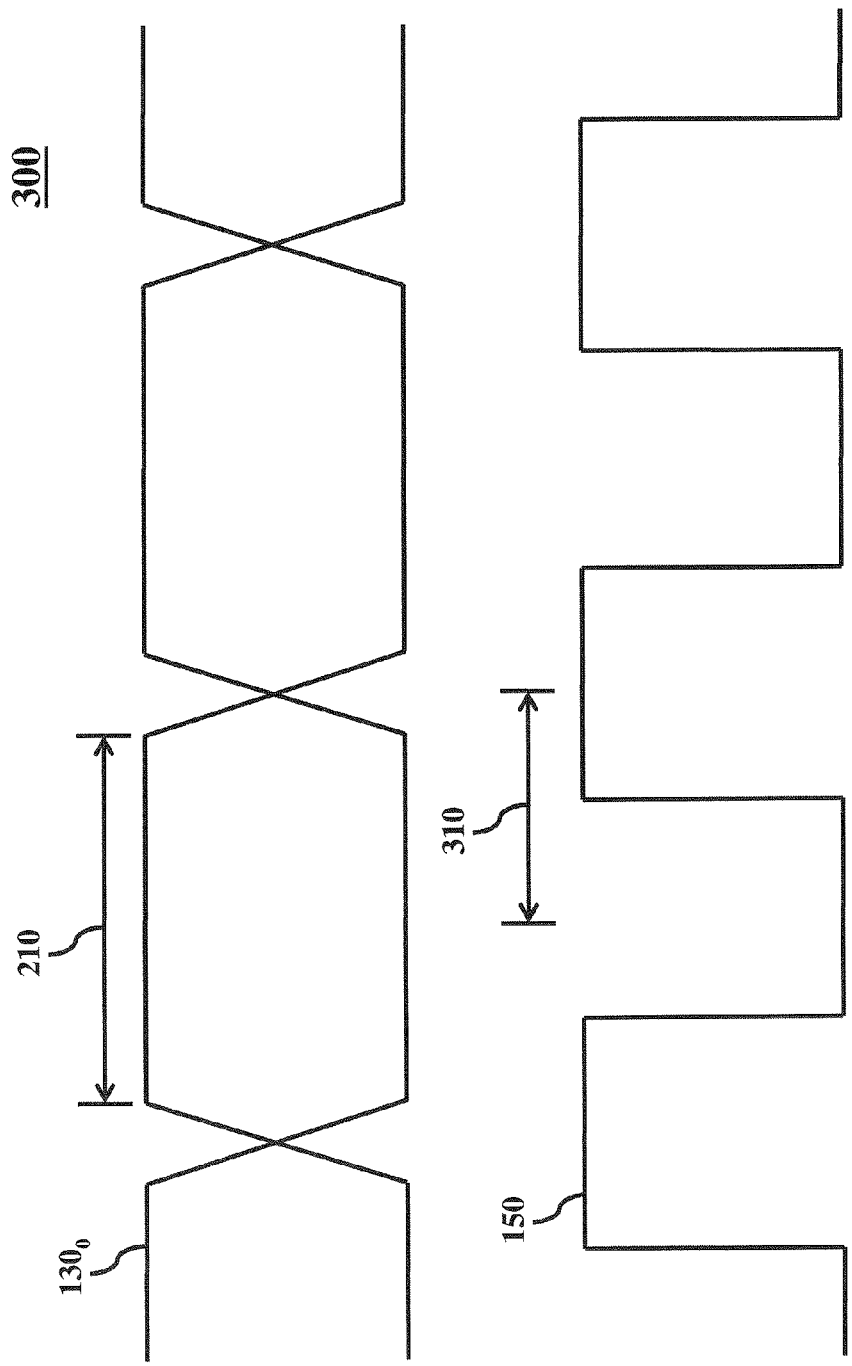
FIG. 3 is an illustration of an exemplary write timing diagram that is not representative of proper data recovery by a memory device.

FIG. 3 is an illustration of an exemplary write timing diagram 300 for computer system 100 that is not representative of proper data recovery by memory device 120. Similar to write timing diagram 200, write timing diagram 300 includes timings for the data eye of data signal $130_0$ and clock signal 150. However, clock signal 150 has a relative phase difference 310 (or timing skew) with respect to data signal $130_0$, where phase difference 310 may not provide memory device 120 a sufficient amount of time to sample data signal $130_0$ (e.g., a sufficient amount of time for memory device 120 to latch data signal $130_0$). Variations in relative phase difference 310 between data signal $130_0$ and clock signal 150 can be caused by various factors such as, for example, temperature and jitter in computer system 100. In exemplary write timing diagram 300, relative phase difference 310 can be defined by a difference between a center of data eye 210 and a center of clock signal 150 when clock signal 150 samples data signal $130_0$ (e.g., when clock signal 150 is HIGH or has a logic value of '1').

As the operating frequency of computer system 100 increases, memory device 120 not only needs to sample signals on data bus $130_7$-$130_0$ at a faster frequency, but also needs to sample the data signals at the proper time. Clock signal 150 should be optimally aligned with signals on data bus $130_7$-$130_0$ to ensure proper sampling of the data. To align clock signal 150 with signals on data bus $130_7$-$130_0$, the relative phase difference (or timing skew) between signals on data bus $130_7$-$130_0$ and clock signal 150 can be monitored and adjusted based on an error detection function. As a result, computer system 100 can be configured such that the write timing between processing unit 110 and memory device 120 can be optimized.

Figure 4:
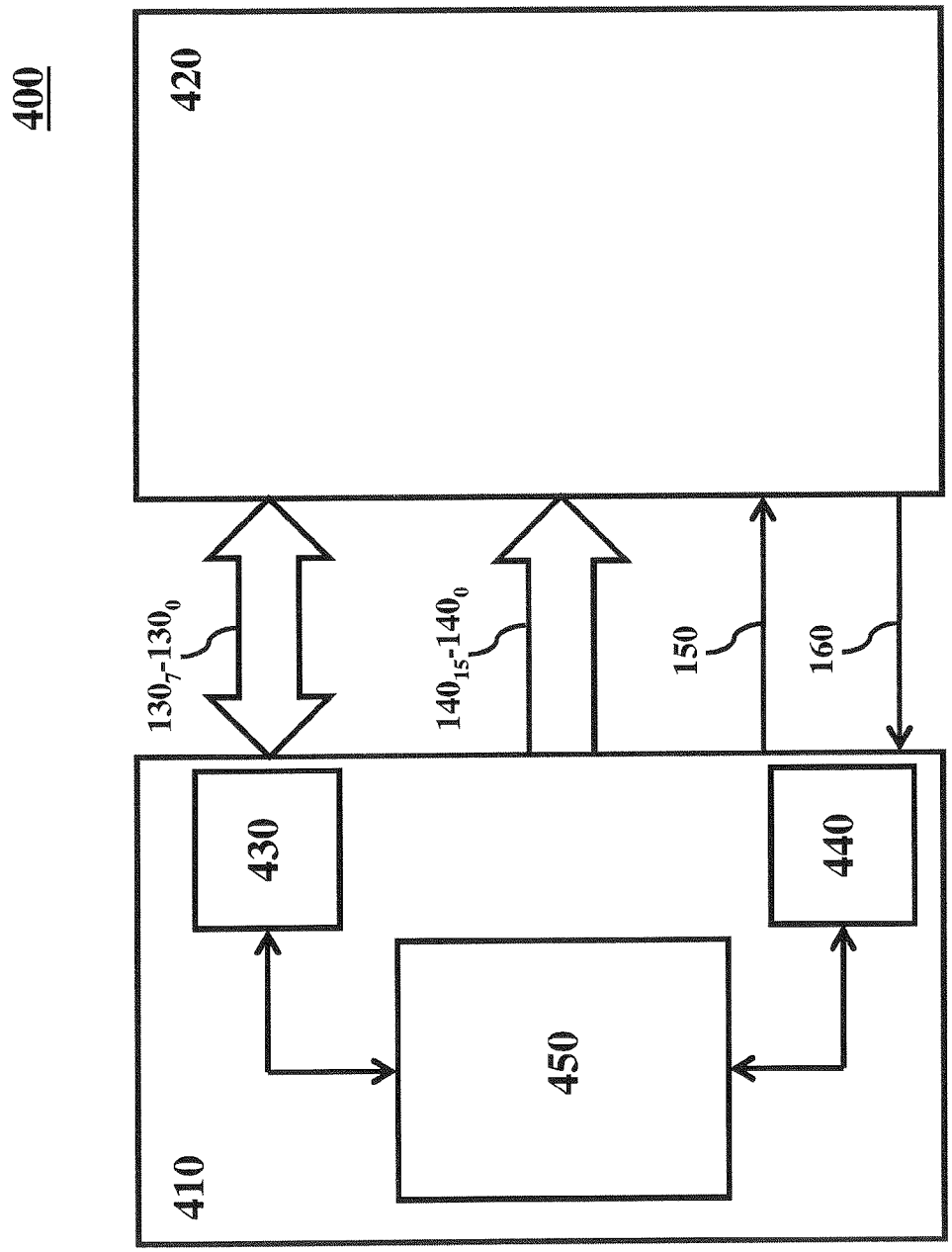
FIG. 4 is an illustration of an embodiment of a computer system to adjust write timing in a memory device.

FIG. 4 is an illustration of an embodiment of a computer system 400 to adjust write timing in a memory device. Computer system 400 includes a processing unit 410, a memory device 420, data bus $130_7$-$130_0$, A/C bus $140_{15}$-$140_0$, clock signal 150 (also referred to herein as a write clock signal), and EDC signal 160. Data bus $130_7$-$130_0$, A/C bus $140_{15}$-$140_0$, write clock signal 150, and EDC signal 160 function in a similar manner as that described above with respect to FIG. 1.

In an embodiment, processing unit 410 and memory device 420 are integrated circuit (IC) devices on a circuit board with data bus $130_7$-$130_0$, A/C bus $140_{15}$-$140_0$, and write clock signal 150 communicatively coupling the two IC devices, where data bus $130_7$-$130_0$, A/C bus $140_{15}$-$140_0$, write clock signal 150, and EDC signal 160 can be wires, interconnects, or circuit board traces. In another embodiment, processing unit 410 and memory device 420 are integrated on a single IC device with data bus $130_7$-$130_0$, A/C bus $140_{15}$-$140_0$, write clock signal 150, and EDC signal 160 communicatively coupling processing unit 410 to memory device 420.

Data bus $130_7$-$130_0$, A/C bus $140_{15}$-$140_0$, write clock signal 150, and EDC signal 160 are connected to input/output (I/O) ports of processing unit 410 and memory device 420 that are used in the modes of operation of memory device 420 (e.g., read, write, idle, and refresh modes of operation). I/O ports that connect a processing unit to a memory device (e.g., DQ and clock pins) are known to persons skilled in the relevant art.

Processing unit 410 is a GPU according to an embodiment of the present invention. Alternatively, in another embodiment, processing unit 410 can be a CPU or a memory controller. Based on the description herein, a person skilled in the relevant art will recognize that embodiments of the present invention can be implemented with other types of processing units, which are within the scope and spirit of the present invention.

In an embodiment, processing unit 410 includes phase delay circuits 430 and 440 and controller 450. In an embodiment, phase delay circuit 430 is configured to delay a transmission of signals traveling on data bus $130_7$-$130_0$. Similarly, in an embodiment, phase delay circuit 440 is configured to delay write clock signal 150. Controller 450 is configured to control an amount of phase delay for each phase delay circuit 430 and 440 according to an embodiment of the present invention. The amount of phase delay issued by controller 450 to phase delay circuits 430 and 440 is described in detail below with respect to method 500 of FIG. 5. Phase delay circuits and associated controllers used to control the phase delay circuits are known to persons of ordinary skill in the relevant art.

In reference to FIG. 4, in an embodiment, memory device 420 is a dynamic random access memory (DRAM) device. Based on the description herein, a person skilled in the relevant art will recognize that embodiments of the present invention can be implemented with other types of memory devices. These other types of memory devices are within the scope and spirit of the present invention.

Figure 5:
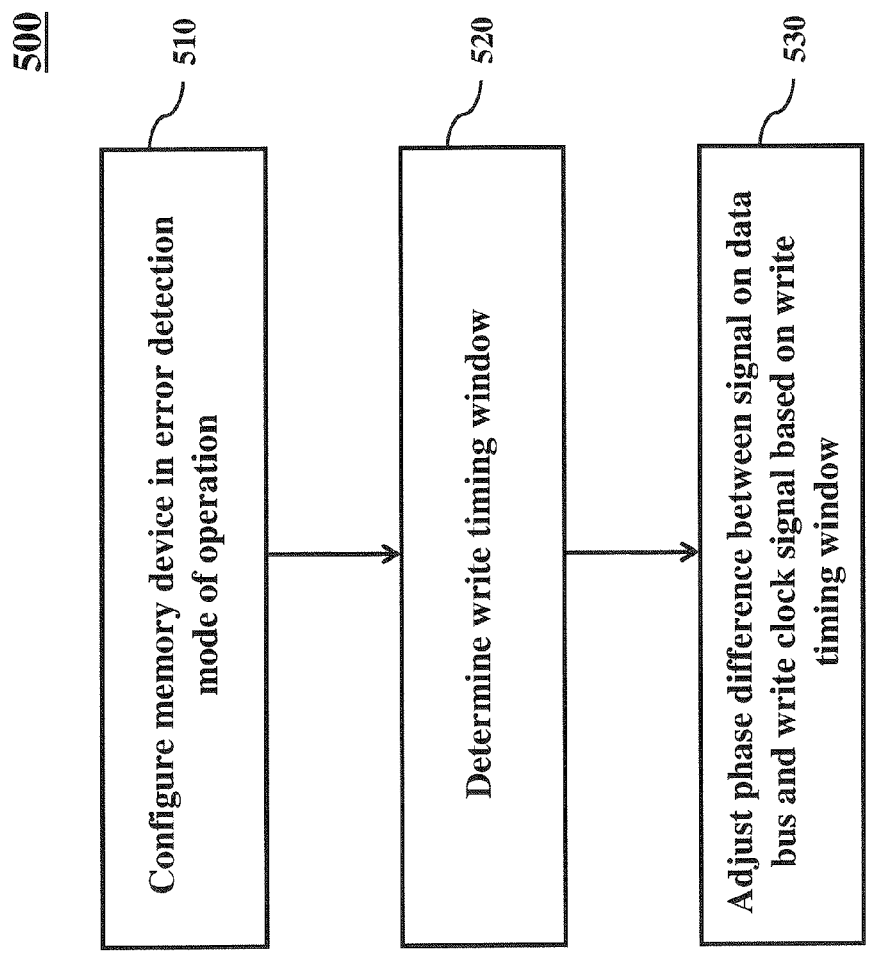
FIG. 5 is an illustration of an embodiment of a method for adjusting write timing in a memory device.

FIG. 5 is an illustration of an embodiment of a method 500 for adjusting write timing in a memory device. Method 500 can occur using, for example, computer system 400 of FIG. 4. For explanation purposes, computer system 400 will be used to facilitate in the description of method 500. However, based on the description herein, a person of ordinary skill in the relevant art will recognize that method 500 can be implemented in other computer systems.

In an embodiment, method 500 can be used by computer system 400 to adjust write timing between processing unit 410 and memory device 420. In particular, through one or more sequences of writing one or more data patterns to and reading corresponding error detection function results from memory device 420, controller 450 of processing unit 410 can adjust a phase difference between data signals on data bus $130_7$-$130_0$ and write clock signal 150 (via phase delay circuits 430 and 440) such that memory device 420 properly recovers data from data bus $130_7$-$130_0$.

In reference to method 500 of FIG. 5, in step 510, processing unit 410 issues one or more commands to configure memory device 420 in an error detection mode of operation. In an embodiment, memory device 420 can be in an error detection mode of operation during an active mode of operation of memory device 420. These active modes of operation can include, for example, a read and write mode of operation. In another embodiment, memory device 420 can be in an error detection mode of operation when memory device resources are inactive. In these modes of operation, memory device resources such as, for example, data bus $130_7$-$130_0$, A/C bus $140_{15}$-$140_0$, and write clock signal 150 are not being used by computer system 400 for a read or write mode of operation.

For ease of explanation, the following description of method 500 is described in the context of an error detection mode where memory device resources are inactive (e.g., data bus $130_7$-$130_0$, A/C bus $140_{15}$-$140_0$, and write clock signal 150 are not being used for a read and/or write operation by computer system 400). However, based on the description herein, a person of ordinary skill in the relevant art will recognize that method 500 can also be implemented in an error detection mode of operation where memory device resources are active (e.g., data bus $130_7$-$130_0$, A/C bus $140_{15}$-$140_0$, and write clock signal 150 are being used for a read and/or write operation by computer system 400).

In step 520, processing unit 410 determines a write timing window between data signals on data bus $130_7$-$130_0$ and write clock signal 150 based on results of an error detection function. The write timing window refers to a time period in which data signals on data bus $130_7$-$130_0$, write clock signal 150, or both the data signals on data bus $130_7$-$130_0$ and write clock signal 150 can be phase-adjusted in relation to one another such that memory device 420 properly recovers the data on data bus $130_7$-$130_0$. In an embodiment, the write timing window is defined by a first timing boundary and a second timing boundary. The write timing window and its associated first and second write timing boundaries are described in further detail below with respect to FIGS. 6-17.

The error detection function refers to an algorithm used in an error detection and correction technique that can be used ensure that data is transmitted without errors from processing unit 410 to memory device 420. As noted above, data transmission errors can be the result of variations such as, for example, temperature and jitter in computer system 400. The error detection function, as it relates to method 500, is described in further detail below with respect to FIGS. 6-17.

In an embodiment, a first data pattern is used to adjust the write timing of memory device 420. The first data pattern can be, for example, an 8-bit data pattern with a random combination of logic values of 1's and 0's. In an embodiment, processor 410 performs an error detection function on the first data pattern to generate, for example, a parity value, checksum value, or another type of result from an error detection function. In an embodiment, the error detection function implements a checksum scheme, where the checksum value of the first data pattern represents a hashed version of the first data pattern with a fixed-size bit-length. The result of the error detection function on the first data pattern is stored in processor 410 to be used for comparison purposes (as described further below) according to an embodiment of the present invention.

Parity schemes and checksum schemes, among others, are used in conjunction with error detection and correction (EDC) techniques and are known to those persons skilled in the relevant art. Based on the description herein, a person of ordinary skill in the relevant art will recognize that other error detection functions can be used in conjunction with EDC techniques. These other error detection functions are within the scope and spirit of the present invention.

In an embodiment, the first data pattern is transmitted from processing unit 410 to memory device 420, where memory device 420 samples the information in the first data pattern at an interface of memory device 420 (e.g., an I/O pin interface of memory device 420) based on write clock signal 150. After the first data pattern is received by memory device 420, memory device 420 performs the error detection function on a second data pattern. The second data pattern represents the first data pattern received at the interface of memory device 420. In an embodiment, the second data pattern can contain different bit information from the bit information of the first data pattern transmitted from processing unit 410 since a timing skew may have occurred between write clock signal 150 and the data signals on data bus $130_7$-$130_0$. This timing skew is similar to the timing skew described above with respect to FIG. 3.

In an embodiment, memory device 420 applies the same error detection function to the second data pattern as processor 410 applied to the first data pattern. The result of the error detection function on the second data pattern represents a hashed version of the second data pattern with a fixed-size bit-length according to an embodiment of the present invention. The result of the error detection function on the second data pattern is transmitted to processor 410 via EDC signal 160 according to an embodiment of the present invention.

Processing unit 410 compares the result of the error detection function on the first data pattern (also referred to herein as "the first result") to the result of the error detection function on the second data pattern (also referred to herein as "the second result") to determine whether the two results match each other. In an embodiment, controller 450 of processing unit 410 compares the first result to the second result, where controller 450 compares the bit information from the first result to bit information from the second result on a on a bit-by-bit basis. In other words, each bit in the first result is compared to a corresponding bit in the second result to determine whether the first and second results match each other.

In an embodiment, controller 450 determines a first timing boundary and a second timing boundary of the write timing window based on the comparison of the first and second results. The following description of the determination of the first and second timing boundaries of the write timing window is described in the context of two scenarios: (1) a scenario when the first and second results match each other as described in FIGS. 6-11; and, (2) a scenario when the first and second results do not match each other as described in FIGS. 12-17. For ease of explanation, the following description of the first and timing boundaries of the write timing window is based on data signal $130_O$ of data bus $130_7$-$130_O$. A person of ordinary skill in the relevant art will recognize that, based on the description herein, the flowcharts and exemplary timing diagrams described below are equally applicable to data signals on data bus $130_7$-$130_O$.

Figure 6:
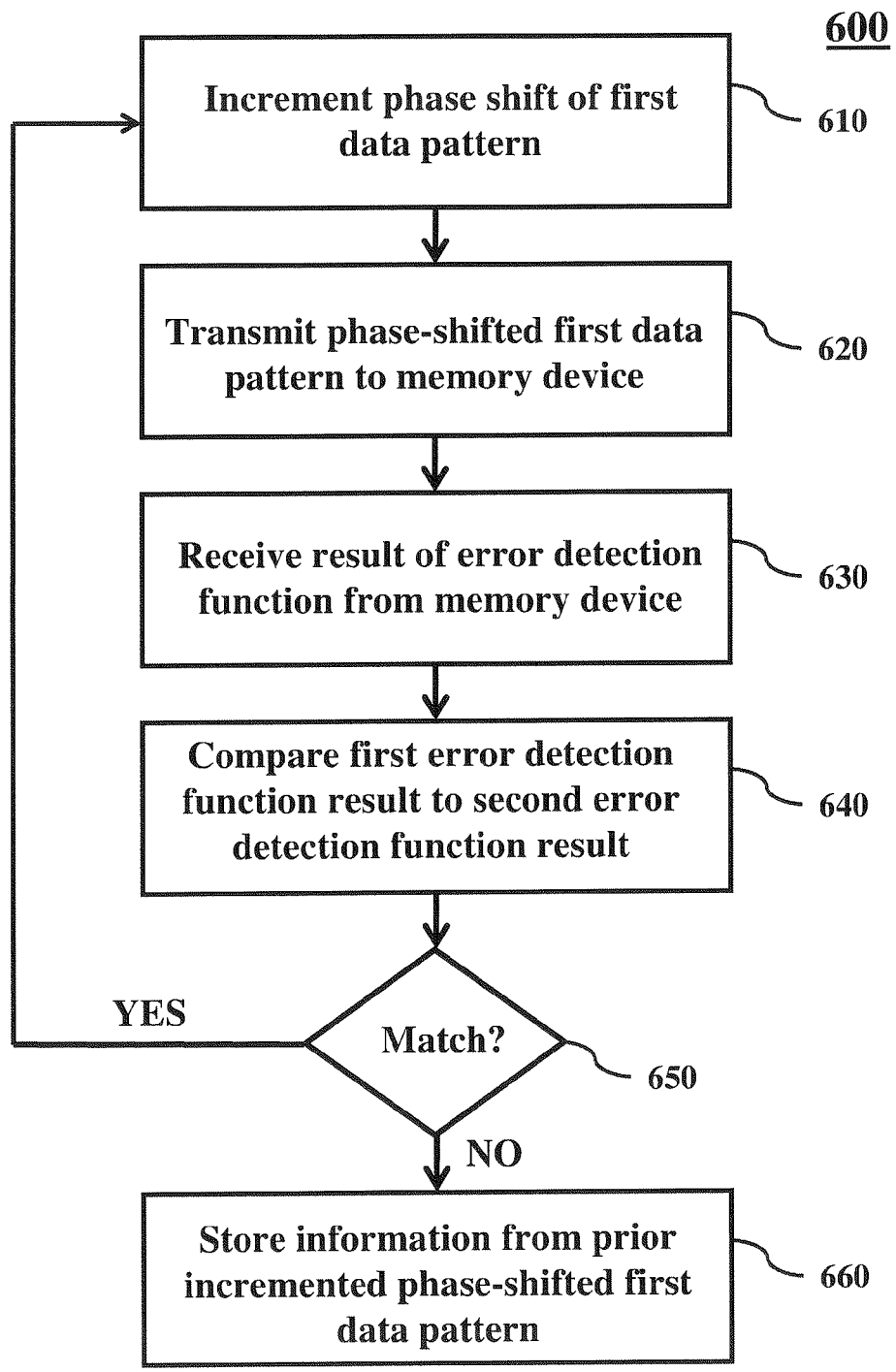
FIG. 6 is an illustration of an embodiment of a flowchart to determine a first write timing boundary of a write timing period when first and second error detection function results match each other.
Figure 7:
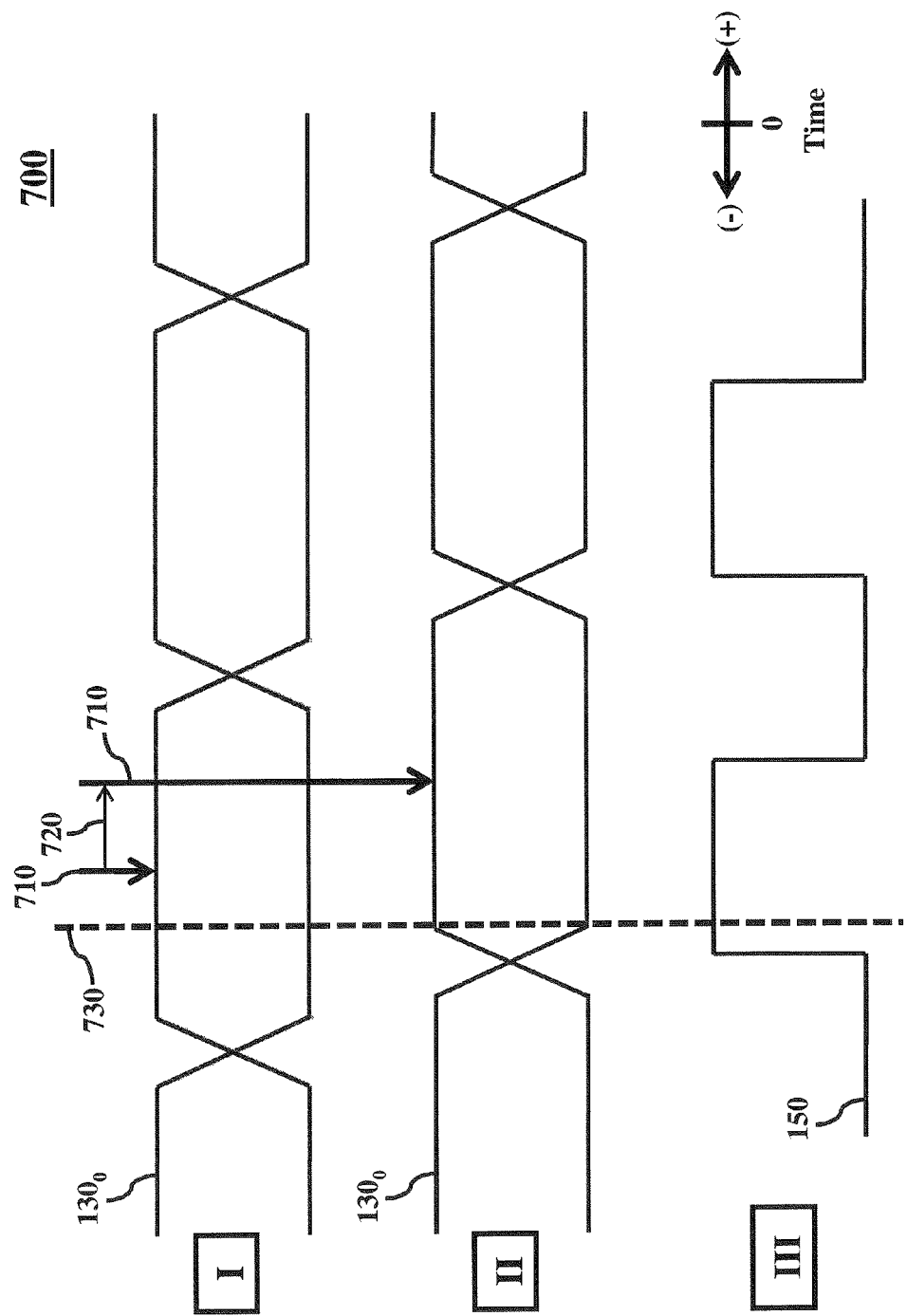
FIG. 7 is an illustration of an exemplary timing diagram to facilitate in an explanation of a flowchart to determine a first write timing boundary of a write timing period when first and second error detection function results match each other.

FIG. 6 is an illustration of an embodiment of a flowchart 600 to determine the first timing boundary of the write timing window when the first and second results match each other. An exemplary timing diagram 700 of FIG. 7 will be used to facilitate in the explanation of flowchart 600. In reference to timing diagram 700, timing diagrams I and III represent data signal $130_O$ and write clock signal 150, respectively. Here, memory device 420 can properly recover data from data signal $130_O$ since write clock signal 150 has a sufficient amount of time to sample data signal $130_O$ (e.g., a sufficient amount of time for memory device 420 to latch data signal $130_O$). This is similar to the timing relationship between data signal $130_O$ and clock signal 150 described above with respect to FIG. 2. Timing diagram II of FIG. 7 is a phase-shifted representation of data signal $130_O$ and will be described below with respect to flowchart 600.

In reference to flowchart 600 of FIG. 6, the starting point of flowchart 600 considers the situation when the first result matches the second result. This is the case since, as noted above with respect to timing diagram 700, memory device 420 has a sufficient amount of time to sample data signal $130_O$ (in timing diagram I of FIG. 7). Accordingly, the result of the error detection function on the first data pattern is identical to the result of the error detection function on the second data pattern, according to an embodiment of the present invention. In an embodiment, processing unit 410 executes the steps of flowchart 600 when determining the first timing boundary of the write timing window.

In step 610, processing unit 410 introduces a positive incremental phase shift to the first data pattern. In an embodiment, the incremental phase shift is defined as a fraction of a cycle of write clock signal 150. For instance, the fraction can be $\frac{1}{10}$, $\frac{1}{5}$, $\frac{3}{10}$, or $\frac{2}{5}$ of write clock signal 150. Further, in reference to timing diagram 700 of FIG. 7, the positive incremental phase shift is defined as an incremental phase shift in the "(+)" direction, according to an embodiment of the present invention.

In step 620, the phase-shifted first data pattern is transmitted to memory device 420.

In step 630, processing unit 410 receives a result from the error detection function applied to a second data pattern. The second data pattern represents the phase-shifted first data pattern received at an interface of memory device 420. In an embodiment, memory device 420 performs the same error detection function on the second data pattern as the error detection function applied by processor 410 on the first data pattern. The result of the error detection function on the second data pattern is transmitted from memory device 420 to processing unit 410 via EDC signal 160 according to an embodiment of the present invention.

In step 640, processing unit 410 compares a first result of the error detection function applied to the first data pattern to a second result of the error detection function applied to the second data pattern, where controller 450 stores the bit information of the first result. Controller 450 compares the bit information from the first result to bit information from the second result, where the second result is indicative of the phase-shifted first data pattern received at an interface of memory device 420, according to an embodiment of the present invention. In an embodiment, the first and second results are compared to each other on a bit-by-bit basis.

In step 650, if the bit information from the first result matches the bit information from the second result, processing unit 410 introduces an additional positive incremental phase delay in the first data pattern (step 610) and steps 620-640 are repeated.

In step 660, if the bit information from the first and second results do not match each other, then phase shift information from the prior phase-shifted first data pattern is stored in processing unit 410. In reference to timing diagram 700 of FIG. 7, timing diagram II represents a positive phase-shifted data signal $130_O$ (i.e., positive phase-shifted first data pattern). A marker 710 in timing diagrams I and II represents a reference point on data signal $130_O$ to indicate the positive incremental phase shifts in data signal $130_O$. Further, a marker 730 indicates a boundary condition for a relative phase shift between data signal $130_O$ and write clock signal 150, where if additional increments of positive phase shifts are introduced to data signal $130_O$ (in timing diagram II of FIG. 7), write clock signal 150 cannot sample a valid data signal $130_O$. This is because, with any additional positive increments in the phase shift to data signal $130_O$, write clock signal 150 would not have a sufficient amount of time to sample data signal $130_O$ (e.g., a non-sufficient amount of time for memory device 420 to latch data signal $130_O$).

In reference to timing diagram 700 of FIG. 7, a time period 720 represents the first timing boundary of the write timing window according to an embodiment of the present invention. In particular, time period 720 is a boundary condition for a relative phase shift between data signal $130_O$ and write clock signal 150, in which data signal $130_O$ cannot have an additional positive increment in phase shift without risk of an improper data recovery by memory device 420. In an embodiment, in reference to an original phase position of data signal $130_O$ in relation to write clock signal 150 (e.g., marker 710 in timing diagram I of FIG. 7), data signal $130_O$ cannot have a positive phase shift more than time period 720 without risk of improper data recovery by memory device 420.

Figure 8:
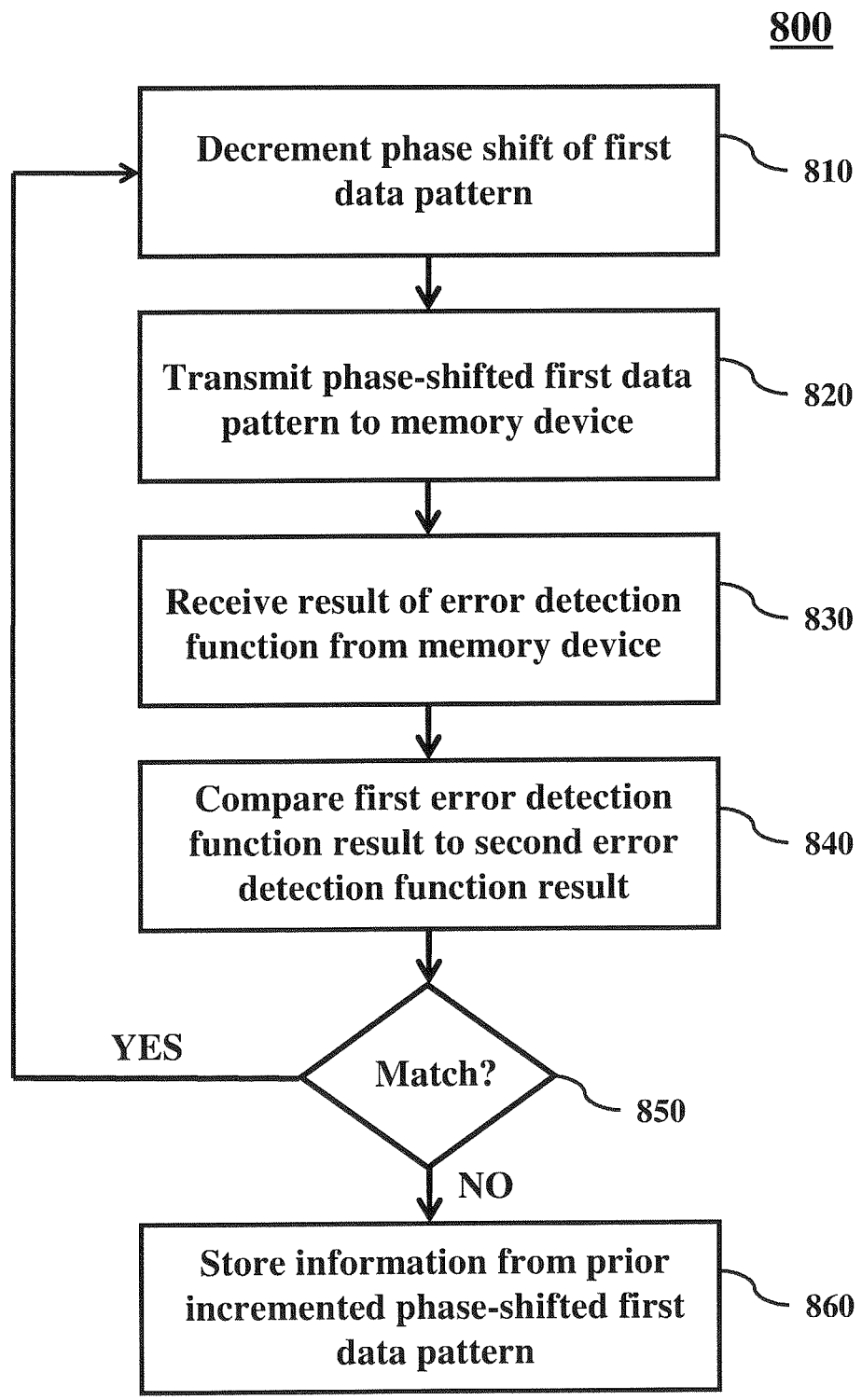
FIG. 8 is an illustration of a flowchart to determine a second write timing boundary of a write timing period when first and second error detection function results match each other.
Figure 9:
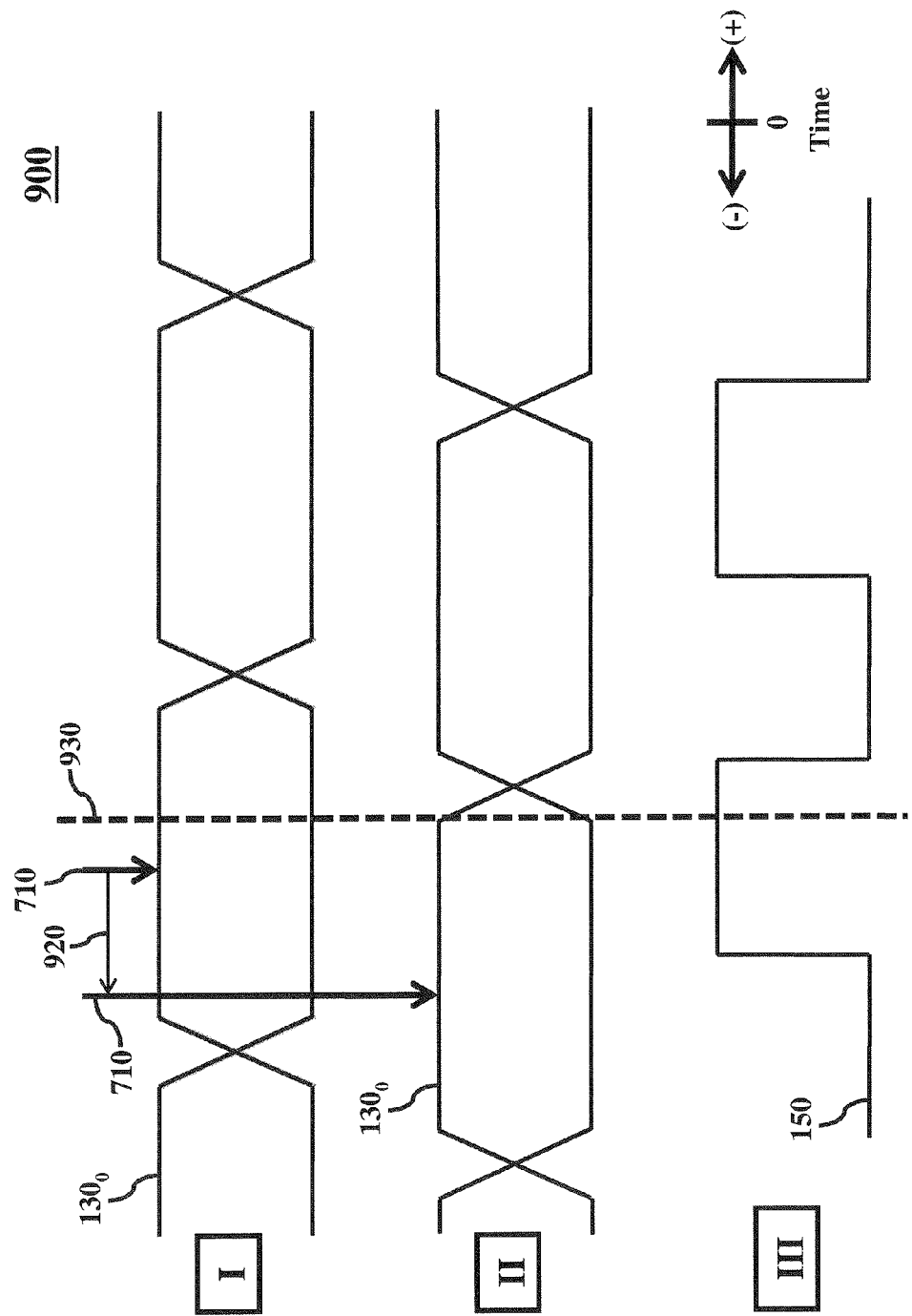
FIG. 9 is an illustration of an exemplary timing diagram to facilitate in an explanation of a flowchart to determine a second write timing boundary of a write timing period when first and second error detection function results match each other.

FIG. 8 is an illustration of an embodiment of a flowchart 800 to determine the second boundary condition of the write timing window when the first and second results match each other. An exemplary timing diagram 900 of FIG. 9 will be used to facilitate in the explanation of flowchart 800. In reference to timing diagram 900, timing diagrams I and III represent data signal $130_O$ and write clock signal 150, respectively. Here, similar to the timing relationship between data signal $130_O$ and clock signal 150 described above with respect to FIG. 2, memory device 420 can properly recover data from data signal $130_O$ since write clock signal 150 has a sufficient amount of time to sample data signal $130_O$ (e.g., a sufficient amount of time for memory device 420 to latch data signal $130_O$). Timing diagram II of FIG. 9 is a phase-shifted representation of data signal $130_O$ and will be described below with respect to flowchart 800.

The steps of flowchart 800 are similar to the steps of flowchart 600, except that the incremental phase shifts in the first data pattern are in the "(−)" direction. In particular, in step 810, processing unit 410 introduces a negative incremental phase shift to the first data pattern. Steps 820-840 perform similar functions as steps 620-640 of flowchart 600, respectively.

In step 850, if the bit information from the first result matches the bit information from the second result, processing unit 410 introduces an additional negative incremental phase delay in the first data pattern (step 810) and steps 820-840 are repeated.

In step 860, if the bit information from the first and second data patterns do not match each other, then phase shift information from the prior phase-shifted first data pattern is stored in processing unit 410. In reference to timing diagram 900 of FIG. 9, timing diagram II represents a negative phase-shifted data signal $130_O$ (i.e., negative phase-shifted first data pattern). Marker 710 in timing diagrams I and II represents a reference point on data signal $130_O$ to indicate the negative incremental phase shifts in data signal $130_O$. Further, a marker 930 indicates a boundary condition for a relative phase shift between data signal $130_O$ and write clock signal 150, where if additional increments of negative phase shifts are introduced to data signal $130_O$ (in timing diagram II of FIG. 9), write clock signal 150 will not have a sufficient amount of time to sample data signal $130_O$ (e.g., a non-sufficient amount of time for memory device 420 to latch data signal $130_O$).

In reference to timing diagram 900 of FIG. 9, a time period 920 represents the second timing boundary of the write timing window according to an embodiment of the present invention. In particular, time period 920 is a boundary condition for a relative phase shift between data signal $130_O$ and write clock signal 150, in which data signal $130_O$ cannot have an additional negative increment in phase shift without risk of an improper data recovery by memory device 420. In an embodiment, in reference to an original phase position of data signal $130_O$ in relation to write clock signal 150 (e.g., marker 710 in timing diagram I of FIG. 9), data signal $130_O$ cannot have a negative phase shift more than time period 920 without risk of improper data recovery by memory device 420.

To summarize, with respect to FIGS. 6-9, the first and second timing boundaries of the write timing window have been defined in terms of a phase shift of data signal $130_O$ in relation to write clock signal 150. In an embodiment, from an original phase position of data signal $130_O$ in relation to write clock signal 150, the write timing window is bounded by the first and second timing boundaries. In an embodiment, the first timing boundary is defined as a maximal positive phase shift of data signal $130_O$ from its original phase position without improper data recovery by memory device 420. Further, the second timing boundary is defined as a maximal negative phase shift of data signal $130_O$ from its original phase position without improper data recovery by memory device 420, according to an embodiment of the present invention.

Based on the description above, in an embodiment, write clock signal 150 can also be used to determine the first and second boundaries of the write timing window. The following description of FIGS. 10 and 11 will be used to facilitate in the explanation of how steps similar to those of flowcharts 600 and 800, respectively, can be applied to write clock signal 150 when determining the first and second boundaries of the write timing window, according to an embodiment of the present invention.

Figure 10:
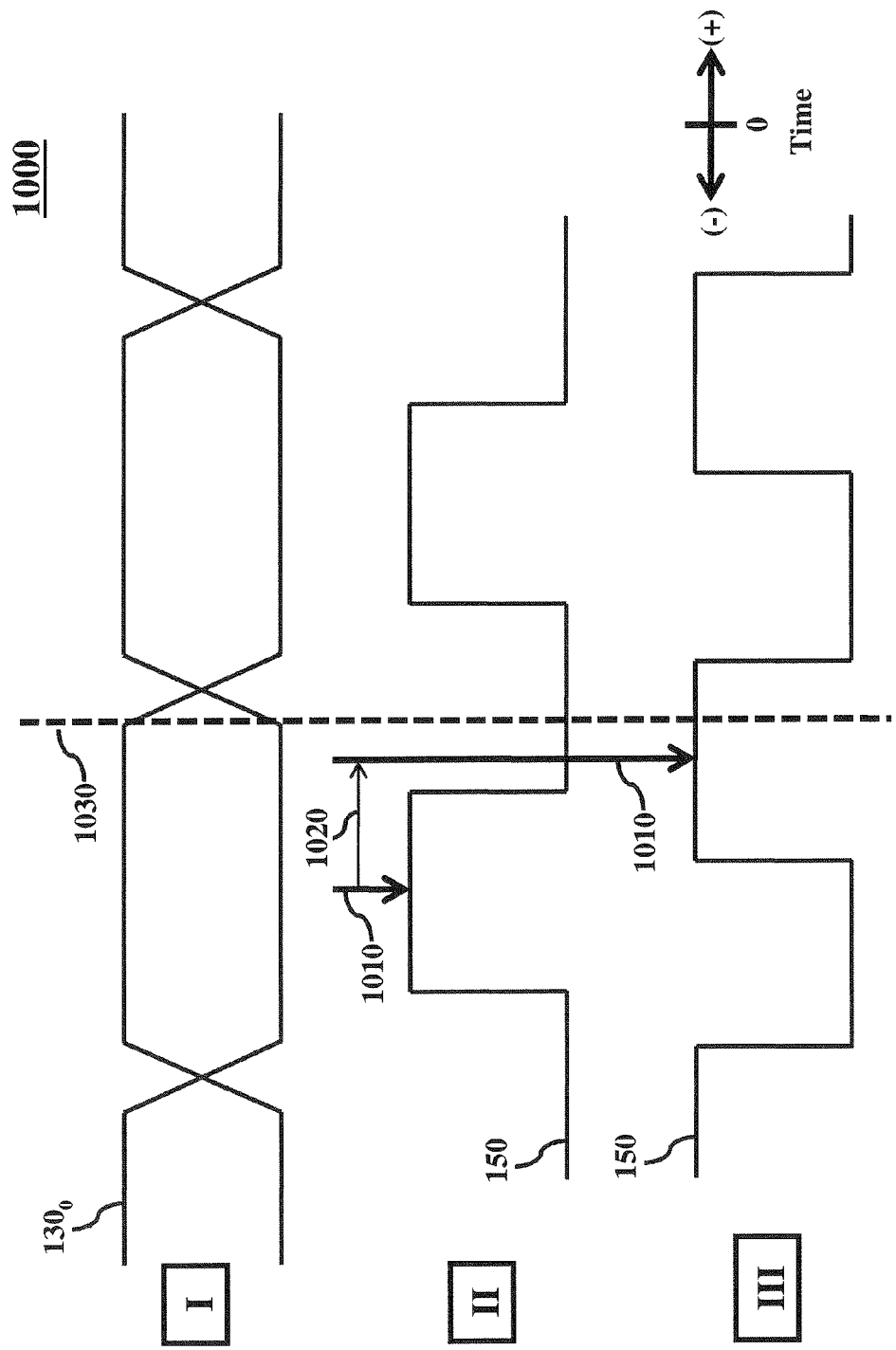
FIG. 10 is an illustration of an exemplary timing diagram to facilitate in an explanation of a determination of a first write timing boundary of a write timing period, based on a write clock signal, when first and second error detection function results match each other.

FIG. 10 is an illustration of an exemplary write timing diagram 1000 that will be used to facilitate in the explanation how steps similar to those in flowchart 600 of FIG. 6 can be used to determine the first timing boundary of the write timing window based on write clock signal 150, according to an embodiment of the present invention. In reference to timing diagram 1000, timing diagrams I and II represent data signal $130_O$ and write clock signal 150, respectively. Here, similar to the timing relationship between data signal $130_O$ and clock signal 150 described above with respect to FIG. 2, memory device 420 can properly recover data from data signal $130_O$ since write clock signal 150 has a sufficient amount of time to sample data signal $130_O$ (e.g., a sufficient amount of time for memory device 420 to latch data signal $130_O$). Timing diagram III of FIG. 10 is a phase-shifted representation of write clock signal 150 and will be described in further detail below.

Similar to step 610 of FIG. 6, processing unit 410 introduces a positive incremental phase shift to write clock signal 150. Next, the transmission, receiving, and comparison steps of steps 620-640 can be applied to the positive phase-shifted write clock signal 150.

In reference to timing diagrams II and III of FIG. 10, a marker 1010 in timing diagrams II and III represents a reference point on write clock signal 150 to indicate the positive incremental phase shifts in write clock signal 150. Further, a marker 1030 indicates a boundary condition for a relative phase shift between data signal $130_O$ and write clock signal 150, where if additional increments of positive phase shifts are introduced to write clock signal 150 (in timing diagram III of FIG. 10), write clock signal 150 will not have a sufficient amount of time to sample data signal $130_O$ (e.g., a non-sufficient amount of time for memory device 420 to latch data signal $130_O$).

In reference to timing diagram 1000 of FIG. 10, a time period 1020 represents the first timing boundary of the write timing window, according to an embodiment of the present invention. In particular, time period 1020 is a boundary condition for a relative phase shift between data signal $130_O$ and write clock signal 150, in which write clock signal 150 cannot have an additional positive increment in phase shift without risk of an improper data recovery by memory device 420. In an embodiment, in reference to an original phase position of write clock signal 150 in relation to data signal $130_O$ (e.g., marker 1010 in timing diagram II of FIG. 10), write clock signal 150 cannot have a positive phase shift more than time period 1020 without risk of improper data recovery by memory device 420.

Figure 11:
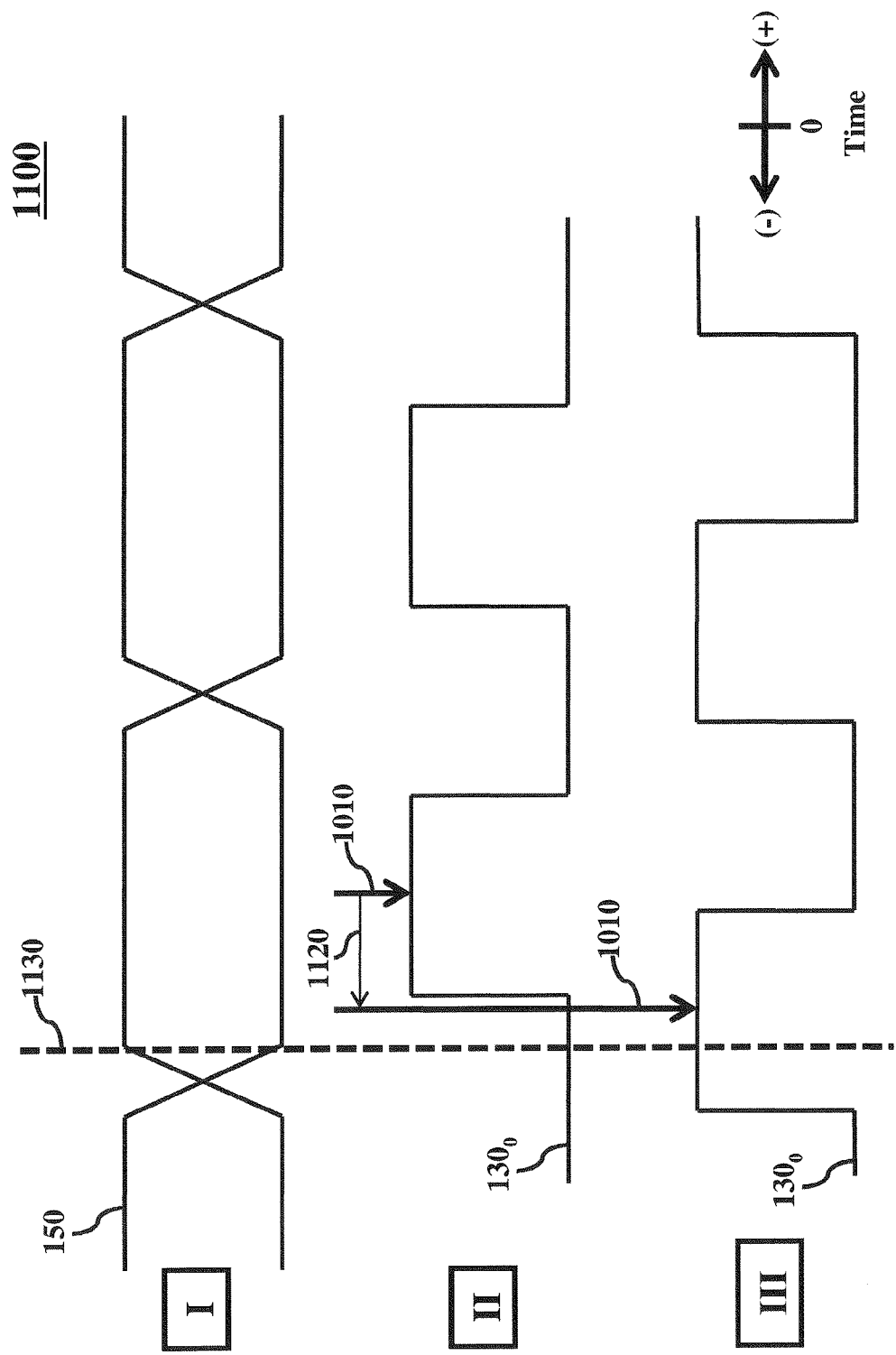
FIG. 11 is an illustration of an exemplary timing diagram to facilitate in an explanation of a determination of a second write timing boundary of a write timing period, based on a write clock signal, when first and second error detection function results match each other.

FIG. 11 is an illustration of an exemplary write timing diagram 1100 that will be used to facilitate in the explanation how steps similar to those in flowchart 800 of FIG. 8 can be used to determine the second timing boundary of the write timing window based on write clock signal 150, according to an embodiment of the present invention. In reference to timing diagram 1100, timing diagrams I and II represent data signal $130_O$ and write clock signal 150, respectively. Here, similar to the timing relationship between data signal $130_O$ and clock signal 150 described above with respect to FIG. 2, memory device 420 can properly recover data from data signal $130_O$ since write clock signal 150 has a sufficient amount of time to sample data signal $130_O$ (e.g., a sufficient amount of time for memory device 420 to latch data signal $130_O$). Timing diagram III of FIG. 11 is a phase-shifted representation of write clock signal 150 and will be described in further detail below.

Similar to step 810 of FIG. 8, processing unit 410 introduces a negative incremental phase shift to write clock signal 150. Next, the transmission, receiving, and comparison steps of steps 820-840 can be applied to the negative phase-shifted write clock signal 150.

In reference to timing diagrams II and III of FIG. 11, marker 1010 in timing diagrams II and III represents a reference point on write clock signal 150 to indicate the negative incremental phase shifts in write clock signal 150. Further, a marker 1130 indicates a boundary condition for a relative phase shift between data signal $130_O$ and write clock signal 150, where if additional increments of negative phase shifts are introduced to write clock signal 150 (in timing diagram III of FIG. 11), write clock signal 150 will not have a sufficient amount of time to sample a valid data signal $130_O$ (e.g., a non-sufficient amount of time for memory device 420 to latch data signal $130_O$).

In reference to timing diagram 1100 of FIG. 11, a time period 1120 represents the second timing boundary of the write timing window, according to an embodiment of the present invention. In particular, time period 1120 is a boundary condition for a relative phase shift between data signal $130_O$ and write clock signal 150, in which write clock signal 150 cannot have an additional negative increment in phase shift without risk of an improper data recovery by memory device 420. In an embodiment, in reference to an original phase position of write clock signal 150 in relation to data signal $130_O$ (e.g., marker 1010 in timing diagram II of FIG. 11), write clock signal 150 cannot have a negative phase shift more than time period 1120 without risk of improper data recovery by memory device 420.

To summarize, with respect to FIGS. 10 and 11, the first and second timing boundaries of the write timing window have been defined in terms of a phase shift of write clock signal 150 in relation to data signal $130_O$. In an embodiment, from an original phase position of write clock signal 150 in relation to data signal $130_O$, the write timing window is bounded by the first and second timing boundaries. In an embodiment, the first timing boundary is defined as a maximal positive phase shift of write clock signal 150 from its original phase position without improper data recovery by memory device 420. Further, the second timing boundary is defined as a maximal negative phase shift of write clock signal 150 from its original phase position without improper data recovery by memory device 420, according to an embodiment of the present invention.

The description above, with respect to FIGS. 6-11, describes techniques on determining the first and second boundaries of the write timing window when the first and second results match each other. In the embodiments described above, either data signal $130_O$ or write clock signal 150 is adjusted by incremental phase shifts such that the relative phase alignment between the two signals allow a proper data recovery by memory device 420. Based on the description herein, a person of ordinary skill in the art will recognize that data signal $130_O$ and write clock signal 150 can be both adjusted with, for example, a proper combination of positive and negative incremental phase shifts such that the relative phase alignment between the two signals allow a proper data recovery by memory device 420.

The following description with respect to FIGS. 12-17 describes the determination of the first and second timing boundaries of the write timing window when the first and second results do not match each other.

Figure 12:
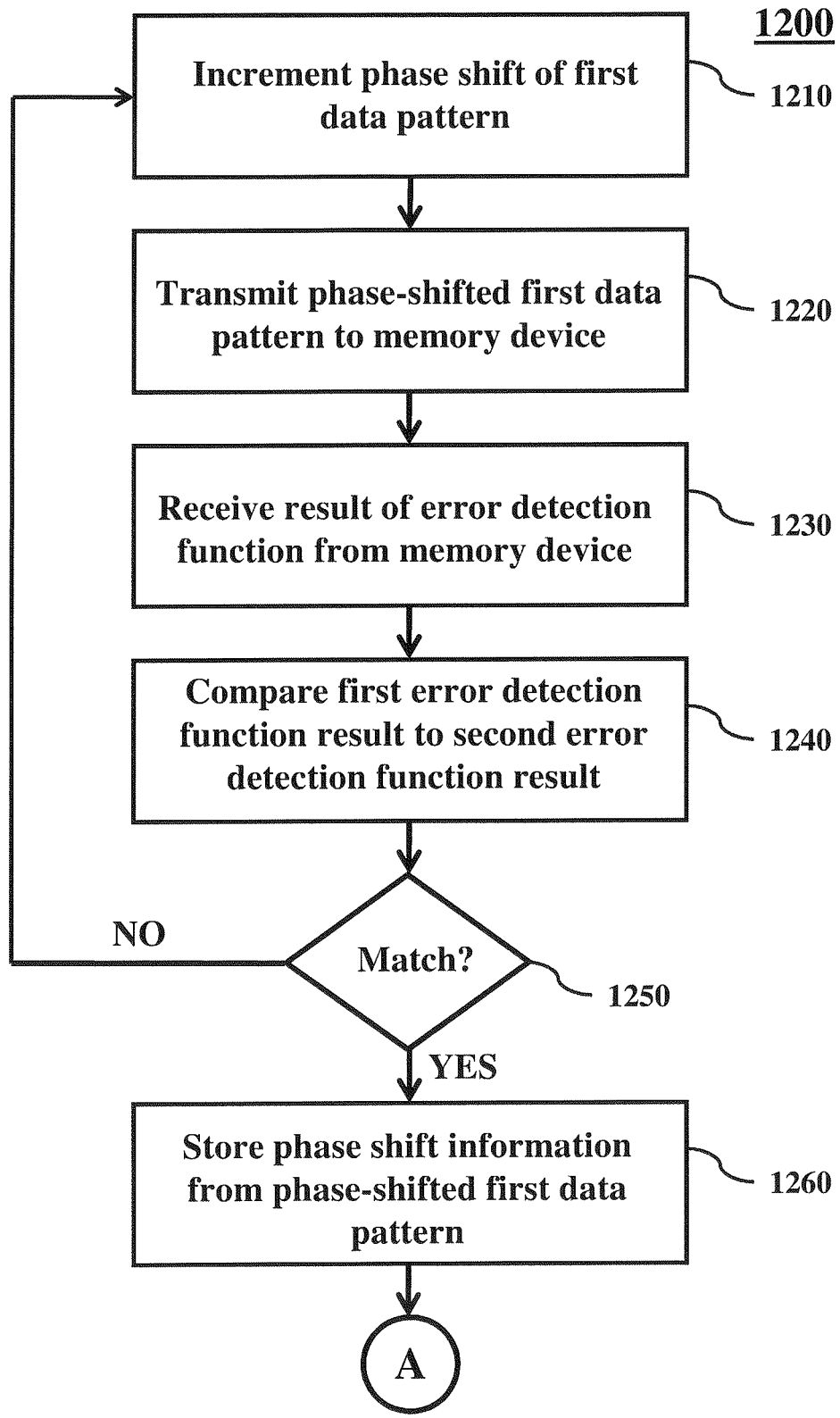
FIG. 12 is an illustration of a flowchart to determine a first write timing boundary of a write timing period when first and second error detection function results do not match each other.
Figure 13:
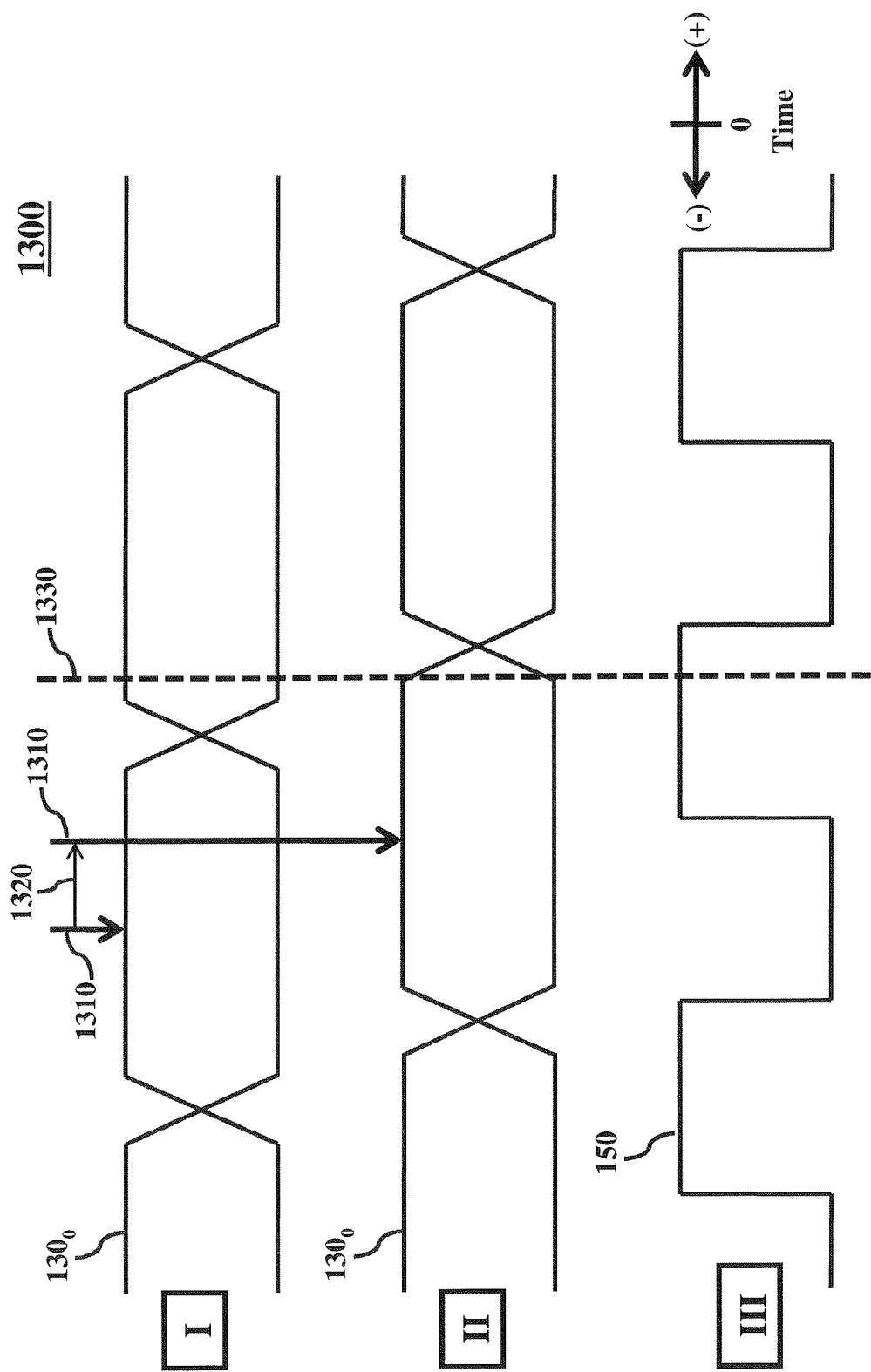
FIG. 13 is an illustration of exemplary timing diagram to facilitate in an explanation of a flowchart to determine a first write timing boundary of a write timing period when first and second error detection function results do not match each other.

FIG. 12 is an illustration of an embodiment of a flowchart 1200 to determine the first timing boundary of the write timing window when first and second results do not match each other. An exemplary timing diagram 1300 of FIG. 13 will be used to facilitate in the explanation of flowchart 1200. In reference to timing diagram 1300, timing diagrams I and III represent data signal $130_O$ and write clock signal 150, respectively. Here, memory device 420 does not properly recover data signal $130_O$ since write clock signal 150 does not have a sufficient amount of time to sample data signal $130_O$ (e.g., a non-sufficient amount of time for memory device 420 to latch data signal $130_O$). This is similar to the timing relationship between data signal $130_O$ and clock signal 150 described above with respect to FIG. 3. Timing diagram II of FIG. 13 is a phase-shifted representation of data signal $130_O$ and will be described below with respect to flowchart 1200.

In reference to flowchart 1200 of FIG. 12, the starting point of flowchart 1200 considers the situation when the first result does not match the second result. This is the case since, as noted above with respect to timing diagram 1300, memory device 420 does not have a sufficient amount of time to sample data signal $130_O$. Accordingly, the result of the error detection function on the first data pattern is not identical to the result of the error detection function on the second data pattern, according to an embodiment of the present invention. In an embodiment, processing unit 410 executes the steps of flowchart 1200 when determining the first timing boundary of the write timing window.

In step 1210, processing unit 410 introduces a positive incremental phase shift to the first data pattern.

In step 1220, the phase-shifted first data pattern is transmitted to memory device 420 and stored in memory device 420.

In step 1230, processing unit 410 receives a result from the error detection function applied to a second data pattern. The second data pattern represents the phase-shifted first data pattern received at an interface of memory device 420. In an embodiment, memory device 420 performs the same error detection function on the second data pattern as the error detection function applied by processor 410 on the first data pattern. The result of the error detection function on the second data pattern is transmitted from memory device 420 to processing unit 410 via EDC signal 160 according to an embodiment of the present invention.

In step 1240, processing unit 410 compares a first result from the error detection function applied to the phase-shifted first data pattern to a second result from the error detection function applied to the second data pattern, where controller 450 stores the bit information of the first result. Controller 450 compares the bit information from the first result to bit information from the second result, where the second result is indicative of the phase-shifted first data pattern received at an interface of memory device 420, according to an embodiment of the present invention. In an embodiment, the first and second results are compared to each other on a bit-by-bit basis.

In step 1250, if the bit information from the first result does not match the bit information from the second result, processing unit 410 introduces an additional positive incremental phase delay in the first data pattern (step 1210) and steps 1220-1240 are repeated.

In step 1260, if the bit information from the first and second result match each other, then phase shift information from the phase-shifted first data pattern is stored in processing unit 410. In reference to timing diagram 1300 of FIG. 13, timing diagram II represents a positive phase-shifted data signal $130_O$ (i.e., positive phase-shifted first data pattern). A marker 1310 in timing diagrams I and II represents a reference point on data signal $130_O$ to indicate the positive incremental phase shifts in data signal $130_O$. Further, a marker 1330 indicates a boundary condition for a relative phase shift between data signal $130_O$ and write clock signal 150, where if additional increments of positive phase shifts are introduced to data signal $130_O$ (in timing diagram II of FIG. 13), write clock signal 150 can be used to sample a valid data signal $130_O$. This is because, with any additional positive increments in the phase shift of data signal $130_O$, write clock signal 150 would have sufficient time to sample a valid data signal $130_O$.

In reference to timing diagram 1300 of FIG. 13, a time period 1320 represents the first timing boundary of the write timing window, according to an embodiment of the present invention. In particular, time period 1320 is a boundary condition for a relative phase shift between data signal $130_O$ and write clock signal 150, in which data signal 130$_0$ can have an additional positive increment in phase shift and memory device 420 can properly recover data signal 130$_0$. In an embodiment, in reference to an original phase position of data signal 130$_0$ in relation to write clock signal 150 (e.g., marker 1310 in timing diagram I of FIG. 13), data signal 130$_0$ is required to have at least a positive phase shift of time period 1320 in order for memory device 420 to properly recover data signal 130$_0$.

Figure 14:
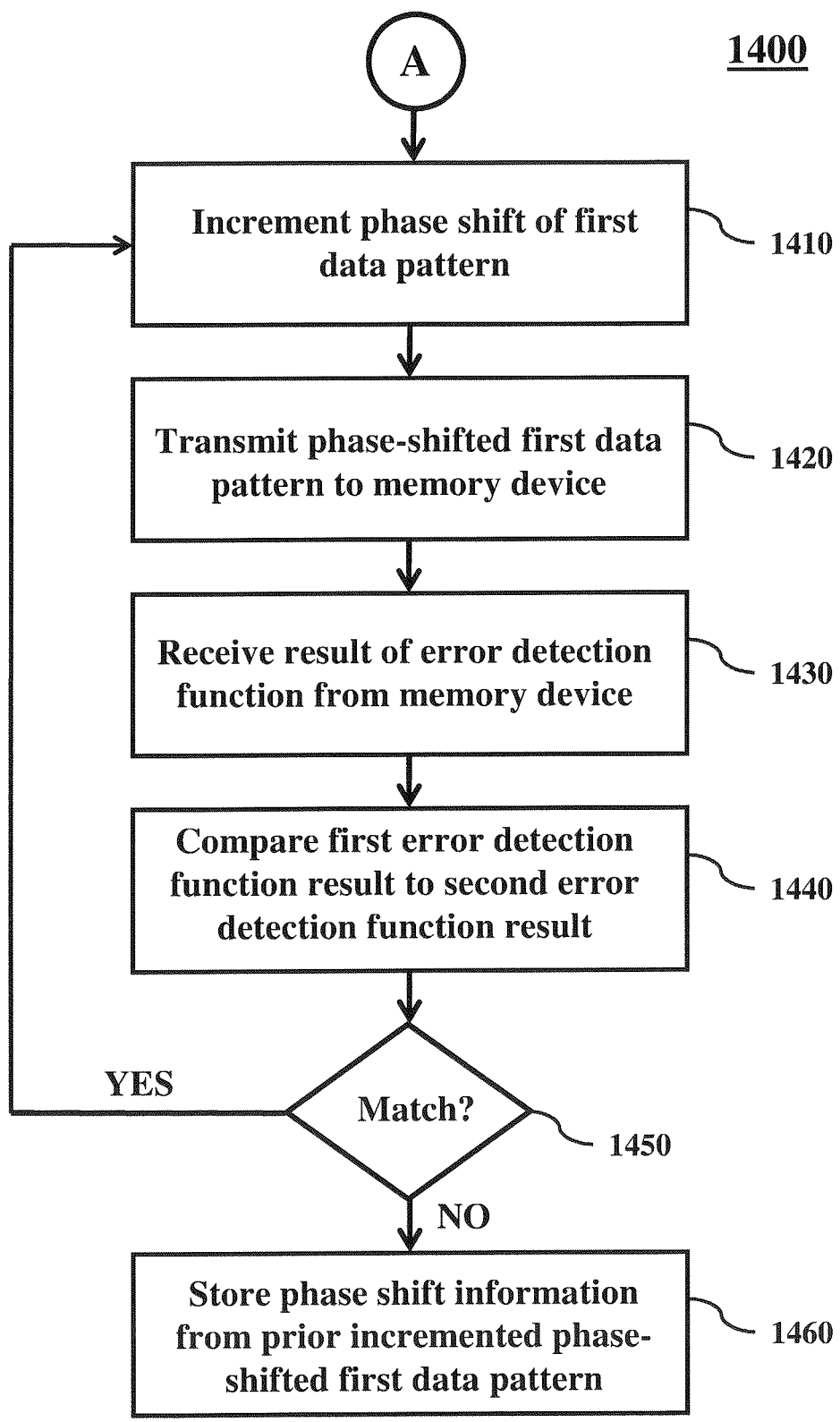
FIG. 14 is an illustration a flowchart to determine a second write timing boundary of a write timing period when first and second error detection function results do not match each other.
Figure 15:
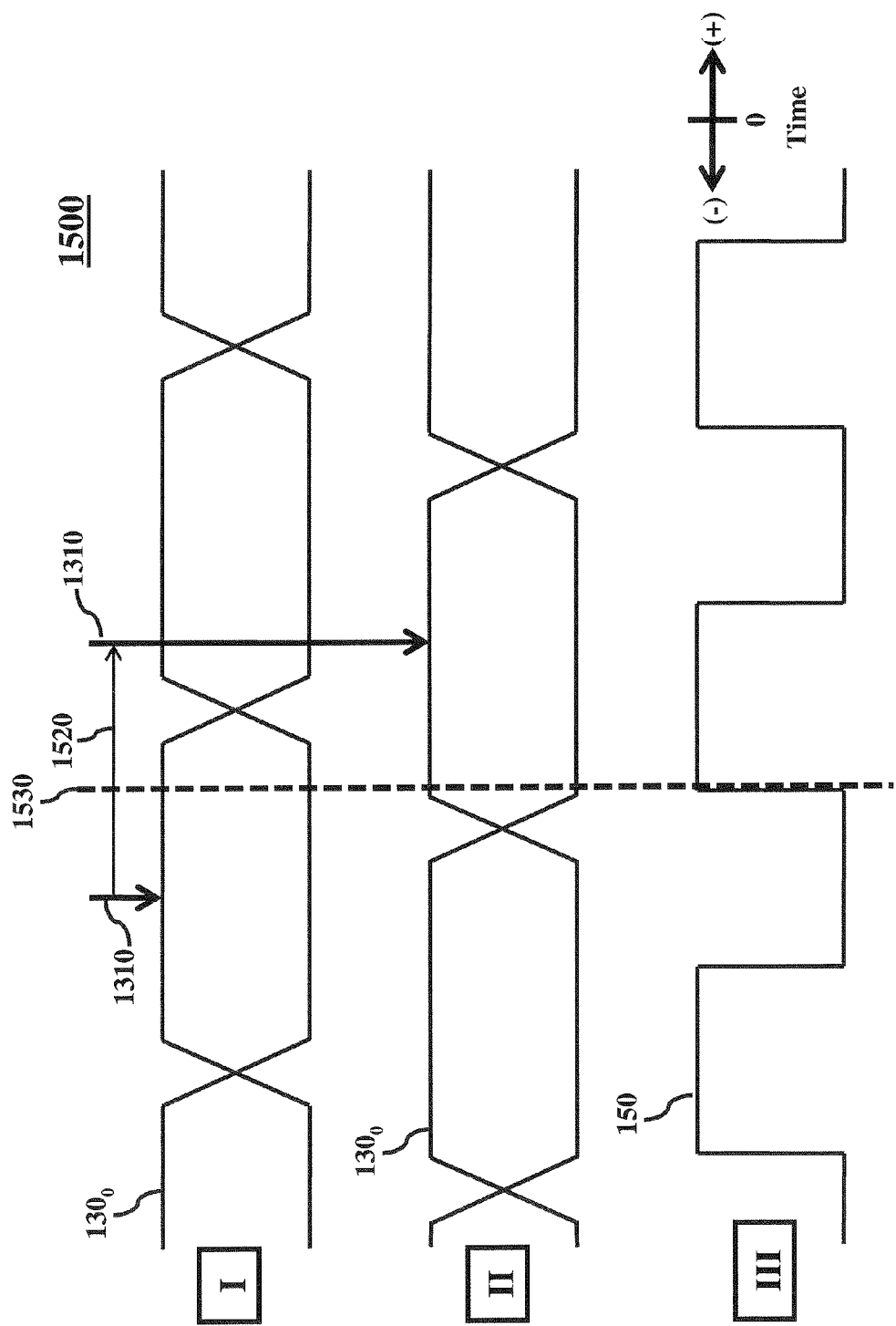
FIG. 15 is an illustration of an exemplary timing diagram to facilitate in an explanation of a flowchart to determine a second write timing boundary of a write timing period when first and second error detection function results do not match each other.

FIG. 14 is an illustration of an embodiment of a flowchart 1400 to determine the second boundary condition of the write timing window when the first and second data results do not match each other. An exemplary timing diagram 1500 of FIG. 15 will be used to facilitate in the explanation of flowchart 1400. In reference to timing diagram 1500, timing diagrams I and III represent data signal 130$_0$ and write clock signal 150, respectively. Here, similar to the timing relationship between data signal 130$_0$ and clock signal 150 described above with respect to FIG. 3, memory device 420 does not properly recover data from data signal 130$_0$ since write clock signal 150 does not have a sufficient amount of time to sample data signal 130$_0$ (e.g., a non-sufficient amount of time for memory device 420 to latch data signal 130$_0$). Timing diagram II of FIG. 15 is a phase-shifted representation of data signal 130$_0$ and will be described below with respect to flowchart 1400.

In an embodiment, the starting point for flowchart 1400 is from the positive phase shift of data signal 130$_0$ corresponding to the first write timing boundary described above with respect to flowchart 1200 of FIG. 12 and timing diagram 1300 of FIG. 13.

The steps of flowchart 1400 are similar to the steps of flowchart 1200. In an embodiment, steps 1410-1440 perform similar functions as steps 1210-1240 of flowchart 1200, respectively.

In step 1450, if bit information from a first result of the error detection function applied to the first data pattern matches bit information from a second result of the error detection function applied to the second data pattern, processing unit 410 introduces an additional positive incremental phase delay in the first data pattern (step 1410) and steps 1420-1440 are repeated.

In step 1460, if the bit information from the first and second results do not match each other, then phase shift information from the prior phase-shifted first data pattern is stored in processing unit 410. In reference to timing diagram 1500 of FIG. 15, timing diagram II represents a positive phase-shifted data signal 130$_0$ (i.e., positive phase-shifted first data pattern). Marker 1310 in timing diagrams I and II represents a reference point on data signal 130$_0$ to indicate the positive incremental phase shifts in data signal 130$_0$. Further, a marker 1530 indicates a boundary condition for a relative phase shift between data signal 130$_0$ and write clock signal 150, where if additional increments of positive phase shifts are introduced to data signal 130$_0$ (in timing diagram II of FIG. 15), write clock signal 150 will sample an invalid data signal 130$_0$ (e.g., a transition state of data signal 130$_0$).

In reference to timing diagram 1500 of FIG. 15, a time period 1520 represents the second timing boundary of the write timing window, according to an embodiment of the present invention. In particular, time period 1520 is a boundary condition for a relative phase shift between data signal 130$_0$ and write clock signal 150, in which data signal 130$_0$ cannot have an additional positive increment in phase shift without risk of an improper data recovery by memory device 420. In an embodiment, in reference to an original phase position of data signal 130$_0$ in relation to write clock signal 150 (e.g., marker 1310 in timing diagram I of FIG. 15), data signal 130$_0$ cannot have a positive phase shift more than time period 1520 without risk of improper data recovery by memory device 420.

To summarize, with respect to FIGS. 12-15, the first and second timing boundaries of the write timing window have been defined in terms of a phase shift of data signal 130$_0$ in relation to write clock signal 150. In an embodiment, from an original phase position of data signal 130$_0$ in relation to write clock signal 150, the write timing window is bounded by the first and second timing boundaries. In an embodiment, the first timing boundary is defined as a minimal positive phase shift of data signal 130$_0$ from its original phase position with proper data recovery by memory device 420. Further, the second timing boundary is defined as a maximal positive phase shift of data signal 130$_0$ from its original phase position with proper data recovery by memory device 420, according to an embodiment of the present invention.

Based on the description above, in an embodiment, write clock signal 150 can also be used to determine the first and second boundaries of the write timing window. The following description of FIGS. 16 and 17 will be used to facilitate in the explanation of how steps similar to those of flowcharts 1200 and 1400, respectively, can be applied to write clock signal 150 when determining the first and second boundaries of the write timing window, according to an embodiment of the present invention.

Figure 16:
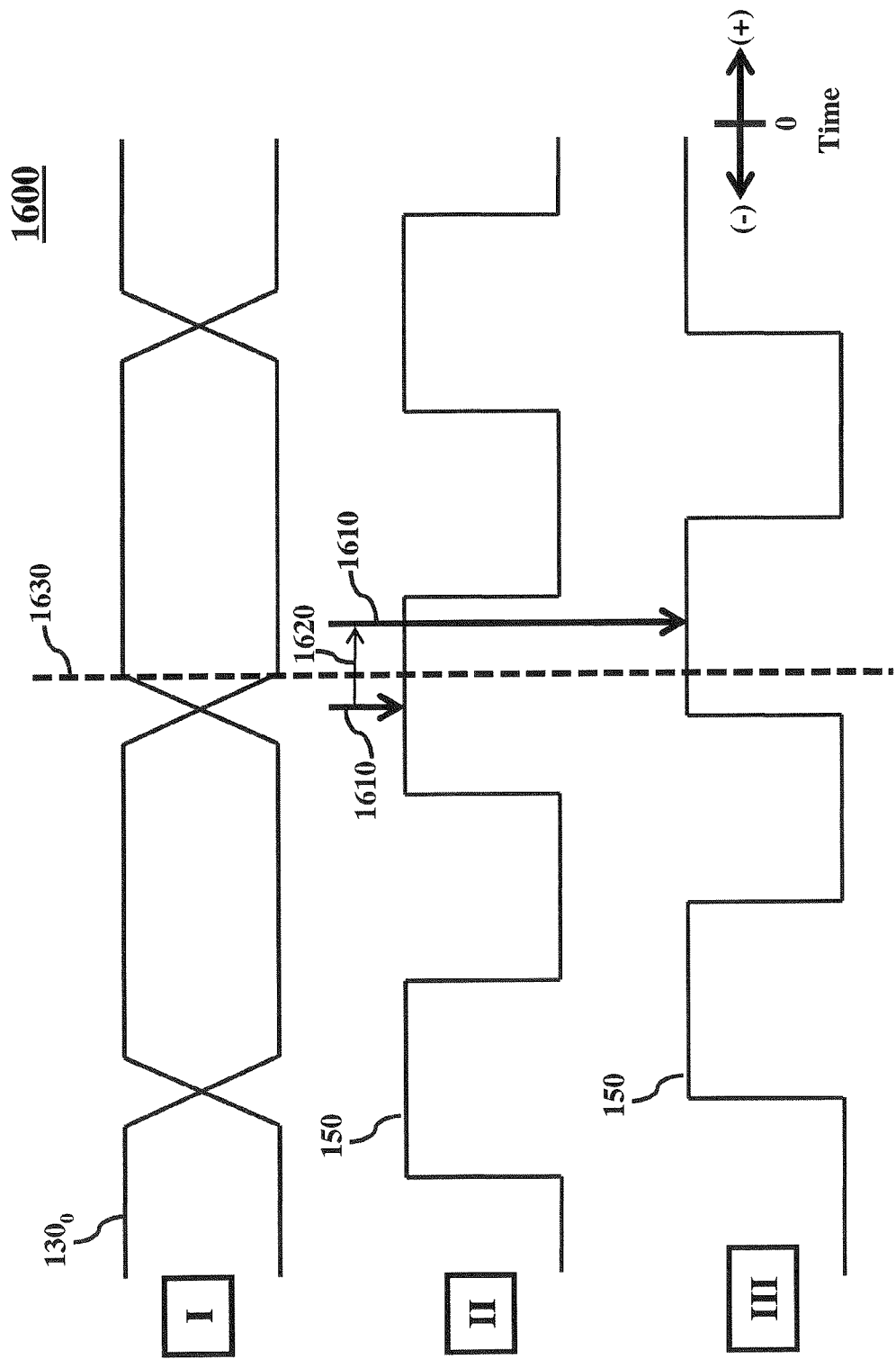
FIG. 16 is an illustration of an exemplary timing diagram to facilitate in an explanation of a determination of a first write timing boundary of a write timing period, based on a write clock signal, when first and second error detection function results do not match each other.

FIG. 16 is an illustration of an exemplary write timing diagram 1600 that will be used to facilitate in the explanation how steps similar to those in flowchart 1200 of FIG. 12 can be used to determine the first timing boundary of the write timing window based on write clock signal 150, according to an embodiment of the present invention. In reference to timing diagram 1600, timing diagrams I and II represent data signal 130$_0$ and write clock signal 150, respectively. Here, similar to the timing relationship between data signal 130$_0$ and clock signal 150 described above with respect to FIG. 3, memory device 420 does not properly recover data from data signal 130$_0$ since write clock signal 150 does not have a sufficient amount of time to sample data signal 130$_0$ (e.g., a non-sufficient amount of time for memory device 420 to latch data signal 130$_0$). Timing diagram III of FIG. 16 is a phase-shifted representation of write clock signal 150 and will be described in further detail below.

Similar to step 1210 of FIG. 12, processing unit 410 introduces a positive incremental phase shift to write clock signal 150. Next, the transmission, receiving, and comparison steps of steps 1220-1240 can be applied to the positive phase-shifted write clock signal 150.

In reference to timing diagrams II and III of FIG. 16, a marker 1610 in timing diagrams II and III represents a reference point on write clock signal 150 to indicate the positive incremental phase shifts in write clock signal 150. Further, a marker 1630 indicates a boundary condition for a relative phase shift between data signal 130$_0$ and write clock signal 150, where if additional increments of positive phase shifts are introduced to write clock signal 150 (in timing diagram III of FIG. 16), write clock signal 150 will have a sufficient amount of time to sample data signal 130$_0$ (e.g., a sufficient amount of time for memory device 420 to latch data signal 130$_0$).

In reference to timing diagram 1600 of FIG. 16, a time period 1620 represents the first timing boundary of the write timing window, according to an embodiment of the present invention. In particular, time period 1620 is a boundary condition to a relative phase shift between data signal 130$_0$ and write clock signal 150, in which write clock signal 150 can have an additional positive increment in phase shift and memory device 420 can properly recover data signal $130_0$. In an embodiment, in reference to an original phase position of write clock signal 150 in relation to data signal $130_0$ (e.g., marker 1610 in timing diagram II of FIG. 16), write clock signal 150 is required to have at least a positive phase shift of time period 1620 in order for memory device 420 to properly recover data signal $130_0$.

Figure 17:
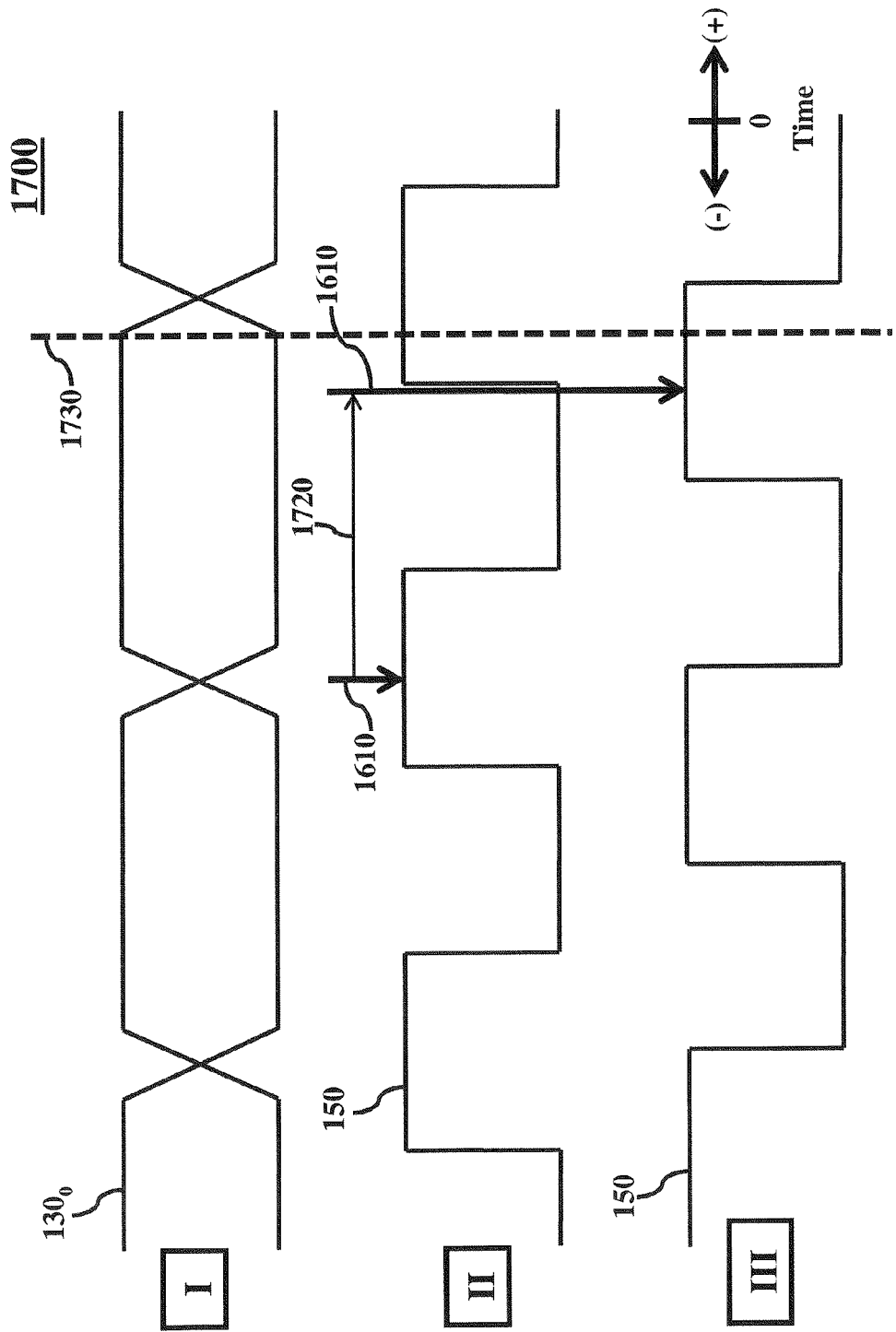
FIG. 17 is an illustration of an exemplary timing diagram to facilitate in an explanation of a determination of a second write timing boundary of a write timing period, based on a write clock signal, when first and second error detection function results do not match each other.

FIG. 17 is an illustration of an exemplary write timing diagram 1700 that will be used to facilitate in the explanation how steps similar to those in flowchart 1400 of FIG. 14 can be used to determine the second timing boundary of the write timing window based on write clock signal 150, according to an embodiment of the present invention. In reference to timing diagram 1700, timing diagrams I and II represent data signal $130_0$ and write clock signal 150, respectively. Here, similar to the timing relationship between data signal $130_0$ and clock signal 150 described above with respect to FIG. 3, memory device 420 does not properly recover data from data signal $130_0$ since write clock signal 150 does not have a sufficient amount of time to sample data signal $130_0$ (e.g., a non-sufficient amount of time for memory device 420 to latch data signal $130_0$). Timing diagram III of FIG. 17 is a phase-shifted representation of write clock signal 150 and will be described in further detail below.

In an embodiment, similar to flowchart 1400, the starting point for write timing diagram 1700 is from the positive phase shift of data signal $130_0$ corresponding to the first write timing boundary described above with respect to timing diagram 1600 of FIG. 16.

Similar to step 1410 of FIG. 14, processing unit 410 introduces a positive incremental phase shift to write clock signal 150. Next, the transmission, receiving, and comparison steps of steps 1420-1440 can be applied to the positive phase-shifted clock write signal 150.

In reference to timing diagrams II and III of FIG. 17, marker 1610 in timing diagrams II and III represents a reference point on write clock signal 150 to indicate the positive incremental phase shifts in write clock signal 150. Further, a marker 1730 indicates a boundary condition for a relative phase shift between data signal $130_0$ and write clock signal 150, where if additional increments of positive phase shifts are introduced to write clock signal 150 (in timing diagram III of FIG. 17), write clock signal 150 will not have a sufficient amount of time to sample a valid data signal $130_0$ (e.g., a non-sufficient amount of time for memory device 420 to latch data signal $130_0$).

In reference to timing diagram 1700 of FIG. 17, a time period 1720 represents the second timing boundary of the write timing window, according to an embodiment of the present invention. In particular, time period 1720 is a boundary condition for a relative phase shift between data signal $130_0$ and write clock signal 150, in which write clock signal 150 cannot have an additional positive increment in phase shift without risk of an improper data recovery by memory device 420. In an embodiment, in reference to an original phase position of write clock signal 150 in relation to data signal $130_0$ (e.g., marker 1610 in timing diagram II of FIG. 17), write clock signal 150 cannot have a positive phase shift more than time period 1720 without risk of improper data recovery by memory device 420.

To summarize, with respect to FIGS. 16 and 17, the first and second timing boundaries of the write timing window have been defined in terms of a phase shift of write clock signal 150 in relation to data signal $130_0$. In an embodiment, from an original phase position of write clock signal 150 in relation to data signal $130_0$, the write timing window is bounded by the first and second timing boundaries. In an embodiment, the first timing boundary is defined as a minimal positive phase shift of write clock signal 150 from its original phase position with proper data recovery by memory device 420. Further, the second timing boundary is defined as a maximal positive phase shift of write clock signal 150 from its original phase position with proper data recovery by memory device 420, according to an embodiment of the present invention.

The description above, with respect to FIGS. 12-17, describes techniques on determining the first and second boundaries of the write timing window when the first and second data results do not match each other. In the embodiments described above, either data signal $130_0$ or write clock signal 150 is adjusted by positive incremental phase shifts such that the relative phase alignment between the two signals allow a proper data recovery by memory device 420. Based on the description herein, a person of ordinary skill in the art will recognize that data signal $130_0$ and write clock signal 150 can each be adjusted by negative incremental phase shifts to determine the write timing window and to achieve a proper phase alignment between the two signals. In addition, based on the description herein, a person of ordinary skill in the art will recognize that data signal $130_0$ and write clock signal 150 can be both adjusted with, for example, a proper combination of positive and negative incremental phase shifts such that the relative phase alignment between the two signals allow a proper data recovery by memory device 420.

The description above of the determination of the write timing window, with respect to step 520 of FIG. 5, assumes that resources of memory device 420 (e.g., data bus $130_7$-$130_0$, A/C bus $140_{15}$-$140_0$, and write clock signal 150) are not being used for a read and/or write mode of operation. However, based on the description herein, a person of ordinary skill in the relevant art will recognize that the determination of the write timing window can be made during a write mode of operation of computer system 400.

In an embodiment, during a write mode of operation, the data written to memory device 420 can be used to determine the write timing window. The write data (e.g., first data pattern) can be phase adjusted, as described above with respect to step 520 of FIG. 5, such that first and second boundaries of the write timing window can be determined, according to an embodiment of the present invention. In phase-adjusting the write data to determine the write timing window, write errors may occur in computer system 400 due to memory device 420 not having a sufficient amount of time to sample data signals $130_7$-$130_0$. Thus, in using the write data to determine the write timing window, a person of ordinary skill in the art will recognize that a threshold condition exists in computer system 400, where a certain number of write errors may noticeably impact the performance of computer system 400 (e.g., graphics on a display monitor may stutter). In this situation, it may be desirable to shorten the number of phase-adjustment iterations in the EDC mode of operation such that the performance of computer system 400 is not affected. The number of read/write operations can be a predetermined value based on the performance of computer system 400, where the predetermined value does not affect system performance, according to an embodiment of the present invention. In an embodiment, the number of read/write operations can be based on a predetermined value that ensures an appropriate timing window from a reference point (e.g., a predetermined number of incremental phase shifts in both "(+)" and "(−)" direction from the original timing position of the EDC data pattern).

In an embodiment, a boundary of the write timing window can be defined by a relative phase difference, between the data signals on data bus $130_7$-$130_0$ and write clock signal 150, that generates a predetermined number of write errors (also referred to herein as a "programmable threshold value"). That is, if a predetermined number of incorrect checksum values occur as a result of repeated write operations between processing unit 410 and memory device 420, then the relative phase difference between the data signals on data bus 130$_7$-130$_0$ and write clock signal 150 is defined as the boundary of the write timing window.

For instance, at a relative phase difference between the data signals on data bus 130$_7$-130$_0$ and write clock signal 150, a write error (e.g., incorrect checksum value) can occur for a particular data pattern transmitted from processing unit 410 to memory device 420. The same data pattern can be transmitted from processing unit 410 to memory device 420 to verify if another write error occurs. If another write error occurs, this process of transmitting the same data pattern to memory device 420 and verifying the checksum value can be repeated. If a predetermined number of write errors have occurred after this iterative process (e.g., the programmable threshold value has been reached), then the relative phase difference between the data signals on data bus 130$_7$-130$_0$ and write clock signal 150 can be defined as the boundary of the write timing window. In an embodiment, the predetermined number of write errors (e.g., programmable threshold value) can be based on the performance of computer system 400, where the predetermined value does not affect system performance (e.g., graphics on a display monitor does not stutter).

In reference to method 500 of FIG. 5, in step 530, processing unit 410 adjusts a phase difference between data signals on data bus 130$_7$-130$_0$ and write clock signal 150 based on the write timing window determined in step 520. As described above, with respect to step 520, the write timing window refers to a time period in which data signals on data bus 130$_7$-130$_0$, write clock signal 150, or both the data signals on data bus 130$_7$-130$_0$ and write clock signal 150 can be phase-adjusted in relation to one another such that memory device 420 properly recovers the data signals on data bus 130$_7$-130$_0$.

In reference to FIG. 4, based on the write timing window for the first data pattern, controller 450 can adjust the phase delay in the transmission of data signals on data bus 130$_7$-130$_0$ and write clock signal 150, via phase delay circuits 430 and 400, respectively, according to an embodiment of the present invention. In an embodiment, the transmission of data signals on data bus 130$_7$-130$_0$ can be adjusted, the transmission of write clock signal 150 can be adjusted, or the transmission of both the data signals on data bus 130$_7$-130$_0$ and write clock signal 150 can be adjusted such that the relative phase difference between the data signals on data bus 130$_7$-130$_0$ and write clock signal 150 is within the write timing window.

After the relative phase difference between the data signals on data bus 130$_7$-130$_0$ and write clock signal 150 has been adjusted based on step 530, processing unit 410 performs write operations on memory device 420 based on the relative phase difference setting, according to an embodiment of the present invention. In an embodiment, the steps of method 500 to adjust the write timing of memory device 420 can be performed on a periodic basis or on an "as-needed" basis as required by computer system 400.

Figure 18:
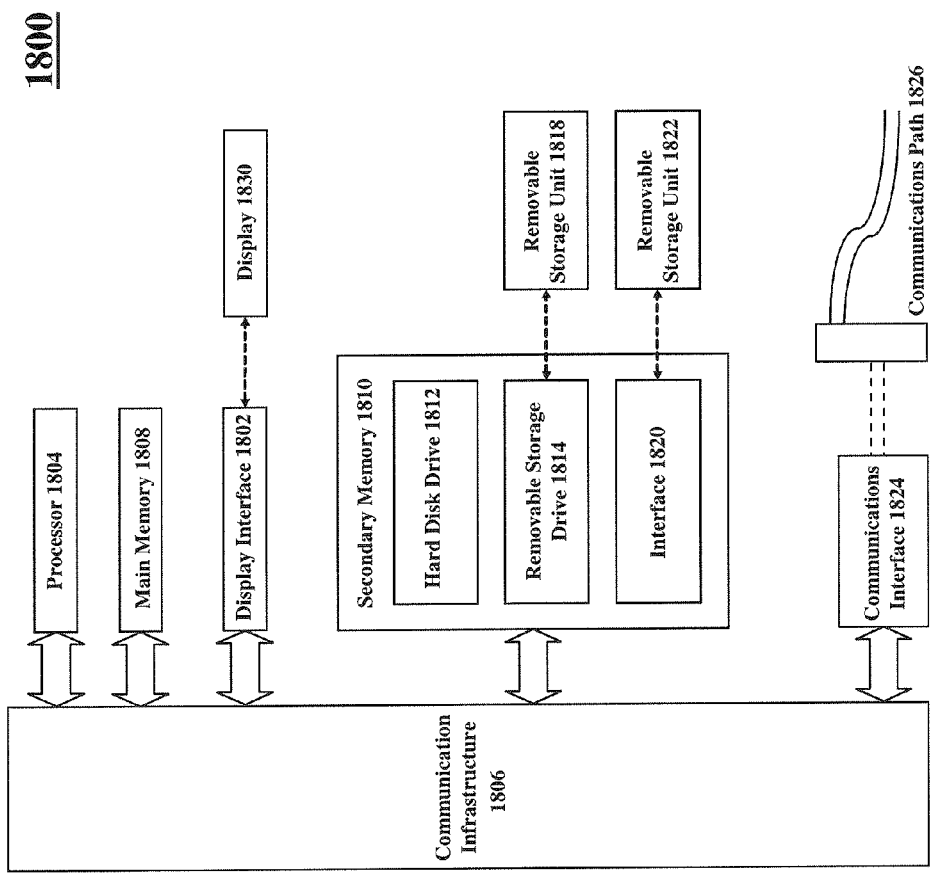
FIG. 18 is an illustration of an example computer system in which embodiments of the present invention can be implemented.

Various aspects of the present invention may be implemented in software, firmware, hardware, or a combination thereof. FIG. 18 is an illustration of an example computer system 1800 in which embodiments of the present invention, or portions thereof, can be implemented as computer-readable code. For example, the method illustrated by flowchart 500 of FIG. 5 can be implemented in computer system 1800. Various embodiments of the present invention are described in terms of this example computer system 1800. After reading this description, it will become apparent to a person skilled in the relevant art how to implement embodiments of the present invention using other computer systems and/or computer architectures.

It should be noted that the simulation, synthesis and/or manufacture of various embodiments of this invention may be accomplished, in part, through the use of computer readable code, including general programming languages (such as C or C++), hardware description languages (HDL) such as, for example, Verilog HDL, VHDL, Altera HDL (AHDL), or other available programming and/or schematic capture tools (such as circuit capture tools). This computer readable code can be disposed in any known computer-usable medium including a semiconductor, magnetic disk, optical disk (such as CD-ROM, DVD-ROM). As such, the code can be transmitted over communication networks including the Internet. It is understood that the functions accomplished and/or structure provided by the systems and techniques described above can be represented in a core (such as a GPU core) that is embodied in program code and can be transformed to hardware as part of the production of integrated circuits.

Computer system 1800 includes one or more processors, such as processor 1804. Processor 1804 may be a special purpose or a general purpose processor (e.g., a GPU). Processor 1804 is connected to a communication infrastructure 1806 (e.g., a bus or network).

Computer system 1800 also includes a main memory 1808, preferably random access memory (RAM), and may also include a secondary memory 1810. Secondary memory 1810 can include, for example, a hard disk drive 1812, a removable storage drive 1814, and/or a memory stick. Removable storage drive 1814 can include a floppy disk drive, a magnetic tape drive, an optical disk drive, a flash memory, or the like. The removable storage drive 1814 reads from and/or writes to a removable storage unit 1818 in a well known manner. Removable storage unit 1818 can comprise a floppy disk, magnetic tape, optical disk, etc. which is read by and written to by removable storage drive 1814. As will be appreciated by persons skilled in the relevant art, removable storage unit 1818 includes a computer-usable storage medium having stored therein computer software and/or data.

In alternative implementations, secondary memory 1810 can include other similar devices for allowing computer programs or other instructions to be loaded into computer system 1800. Such devices can include, for example, a removable storage unit 1822 and an interface 1820. Examples of such devices can include a program cartridge and cartridge interface (such as those found in video game devices), a removable memory chip (e.g., EPROM or PROM) and associated socket, and other removable storage units 1822 and interfaces 1820 which allow software and data to be transferred from the removable storage unit 1822 to computer system 1800.

Computer system 1800 can also include a communications interface 1824. Communications interface 1824 allows software and data to be transferred between computer system 1800 and external devices. Communications interface 1824 can include a modem, a network interface (such as an Ethernet card), a communications port, a PCMCIA slot and card, or the like. Software and data transferred via communications interface 1824 are in the form of signals, which may be electronic, electromagnetic, optical, or other signals capable of being received by communications interface 1824. These signals are provided to communications interface 1824 via a communications path 1826. Communications path 1826 carries signals and can be implemented using wire or cable, fiber optics, a phone line, a cellular phone link, a RF link or other communications channels.

In this document, the terms "computer program medium" and "computer-usable medium" are used to generally refer to media such as removable storage unit 1818, removable storage unit 1822, and a hard disk installed in hard disk drive 1812. Computer program medium and computer-usable medium can also refer to memories, such as main memory 1808 and secondary memory 1810, which can be memory semiconductors (e.g., DRAMs, etc.). These computer program products provide software to computer system 1800.

Computer programs (also called computer control logic) are stored in main memory 1808 and/or secondary memory 1810. Computer programs may also be received via communications interface 1824. Such computer programs, when executed, enable computer system 1800 to implement embodiments of the present invention as discussed herein. In particular, the computer programs, when executed, enable processor 1804 to implement processes of embodiments of the present invention, such as the steps in the method illustrated by flowchart 500 of FIG. 5, discussed above. Accordingly, such computer programs represent controllers of the computer system 1800. Where embodiments of the present invention are implemented using software, the software can be stored in a computer program product and loaded into computer system 1800 using removable storage drive 1814, interface 1820, hard drive 1812, or communications interface 1824.

Embodiments of the present invention are also directed to computer program products including software stored on any computer-usable medium. Such software, when executed in one or more data processing device, causes a data processing device(s) to operate as described herein. Embodiments of the present invention employ any computer-usable or -readable medium, known now or in the future. Examples of computer-usable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage devices, etc.), and communication networks (e.g., wired and wireless communications networks, local area networks, wide area networks, intranets, etc.).

While various embodiments of the present invention have been described above, it should be understood that they have been presented by way of example only, and not limitation. It will be understood by persons skilled in the relevant art that various changes in form and details can be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A method for adjusting write timing in a memory device, the method comprising:
    determining a first result from an error detection function performed on data bits transferred from a processing device to the memory device;
    transmitting the data bits on a data bus to the memory device;
    determining a second result from the error detection function performed on corresponding data bits received by the memory device;
    comparing the first result to the second result to determine write timing window with a first timing boundary and a second timing boundary for a signal on the data bus and a write clock signal, wherein if the first and second results do not match each other,
        iteratively repeating a sequence of the determining the first result, transmitting, determining the second result, and comparing for one or more positive incremental phase shifts in the data bits or the write clock signal to determine the first timing boundary defined by a first positive incremental phase shift in the data bits or the write clock signal in which the first result from the error detection function performed on the positive phase-shifted data bits matches the corresponding second result, and
        starting at the first timing boundary, iteratively repeating the sequence of the determining the first result, transmitting, determining the second result, and comparing for another one or more positive incremental phase shifts in the data bits or the write clock signal to determine the second timing boundary defined by a last positive incremental phase shift its the data bits or the write clock signal in which the first result from the error detection function performed on the positive phase-shifted data bits matches the corresponding second result; and
    adjusting a phase difference between the signal on the data bus and the write clock signal based on the first and second timing boundaries of the write timing window, wherein the memory device recovers the signal on the data bus based on the adjusted phase difference.

2. The method of claim 1, further comprising:
    configuring the memory device in an error detection mode of operation.

3. The method of claim 2, wherein the configuring the memory device in the error detection mode of operation comprises configuring the memory device in a write mode of operation during the error detection mode of operation.

4. The method of claim 1, wherein the determining the first result and the determining the second result comprise performing a parity function or a checksum function.

5. The method of claim 1, wherein, if the first and second results match each other, the comparing comprises:
    iteratively repeating a sequence of the transmitting, determining the second result, and comparing for one or more positive incremental phase shifts in the data bits to determine the first timing boundary, wherein the first timing boundary is defined by a last positive incremental phase shift in the data bits in which the first result from the error detection function performed on the positive phase-shifted data bits matches the corresponding second result; and
    iteratively repeating the sequence of the transmitting, determining the second result, and comparing for one or more negative incremental phase shifts in the data bits to determine the second timing boundary, wherein the second timing boundary is defined by a last negative incremental phase shift in the data bits in which the first result from the error detection function performed on the negative phase-shifted data bits matches the corresponding second result.

6. The method of claim 1, wherein, if the first and second results match each other, the comparing comprises:
  iteratively repeating a sequence of the transmitting, determining the second result, and comparing for one or more positive incremental phase shifts in the write clock signal to determine the first timing boundary, wherein the first timing boundary is defined by a last positive incremental phase shift in the write clock signal in which the first result from the error detection function performed on the data bits matches the corresponding second result; and
  iteratively repeating the sequence of the transmitting, determining the second result, and comparing for one or more negative incremental phase shifts in the write clock signal to determine the second timing boundary, wherein the second timing boundary is defined by a last negative incremental phase shift in the write clock signal in which the first result from the error detection function performed on the data bits matches the corresponding second result.

7. The method of claim 1, wherein the comparing the first result to the second result comprises comparing each bit in the first result to each corresponding bit in the second result to determine whether the first and second results match each other.

8. The method of claim 1, wherein the adjusting the phase difference comprises introducing a phase delay in the signal on the data bus, the write clock signal, or both.

9. A method for adjusting write timing in a memory device, the method comprising:
  performing an error detection function on data bits to generate a first result, wherein the data bits are received at an interface of the memory device based on a write dock signal;
  transmitting the first result to a processing unit; and
  receiving a signal on a data bus, wherein a phase difference between the signal on the data bus and the write dock signal is within a write timing window with a first timing boundary and a second timing boundary, the write timing window based on an iterative comparison between the first result and a second result from the error detection function performed on corresponding data bits transferred from the processing unit to the memory device, wherein if the first and second results do not match each other,
    a sequence of the performing, the transmitting, and receiving the first result to the second result is iteratively repeated for one or more positive incremental phase shifts in the corresponding data bits or the write clock signal to determine the first timing boundary defined by a first positive incremental phase shift in the corresponding data bits or the write clock signal in which the second result from the error detection function performed on the positive phase-shifted corresponding data bits matches the corresponding first result, and
    starting at the first timing boundary, the sequence of the performing, the transmitting, and the receiving is iteratively repeated for another one or more positive incremental phase shifts in the corresponding data bits or the write clock signal to determine the second timing boundary defined by a last positive incremental phase shift in the corresponding data bits or the write clock signal in which the second result from the error detection function performed on the positive phase-shifted corresponding data bits matches the corresponding first result.

10. The method of claim 9, further comprising:
  operating in an error detection mode of operation.

11. The method of claim 9, wherein the receiving the signal on the data bus comprises receiving the signal on the data bus that is between the first timing boundary and the second timing boundary of the write timing window.

12. The method of claim 9, wherein the performing the error detection function comprises performing a parity function or a checksum function.

13. The method of claim 9, wherein, if the first and second results match each other,
  a sequence of the performing, the transmitting, and the receiving is iteratively repeated for one or more positive incremental phase shifts in the corresponding data bits or the write clock signal to determine he first timing boundary, wherein the first timing boundary is defined by a last positive incremental phase shift in the corresponding data bits or the write clock signal in which the second result from the error detection function performed on the positive phase-shifted corresponding data bits matches the corresponding first result; and
  the sequence of the performing, the transmitting, and the receiving is iteratively repeated for one or more negative incremental phase shifts in the corresponding data bits or the write clock signal to determine the second timing boundary, wherein the second timing boundary is defined by a last negative incremental phase shift in the corresponding data bits in which the second result from the error detection function performed on the negative phase-shifted corresponding data bits matches the corresponding first result.

14. A system comprising:
  a memory device; and
  a processing unit coupled to the memory device and configured to:
  determine a first result from an error detection function performed on data bits transferred from the processing unit to the memory device;
  transmit the data bits on a data bus to the memory device;
  determine a second result from the error detection function performed on corresponding data bits received by the memory device;
  compare the first result to he second result to determine a write timing window with a first timing boundary and a second timing boundary for a signal on the data bus and a write clock signal, wherein if the first and second results do not match each other,
    a sequence to re-determine the first result, re-transmit the data bits on the data bus, re-determine the second result, and re-compare the first result to the second result is iteratively repeated for one or more positive incremental phase shifts in the data bits or the write clock signal to determine the first timing boundary defined by a first positive incremental phase shift in the data bits or the write clock signal in which the first result from the error or detection function performed on the positive phase-shifted data bits matches the corresponding second result, and
    starting at the first timing boundary, the sequence to re-determine the first result, re-transmit the data bits on the data bus, re-determine the second result, and re-compare the first result to the second result iteratively repeated for another one or more positive incremental phase shifts in the data bits or the write clock signal to determine the second timing boundary defined by a last positive incremental phase shift in the data bits or the write clock signal in which the first result from the error detection function performed on the positive phase-shifted data bits matches the corresponding second result; and adjust a phase difference between the signal on the data bus and the write clock signal based on the first and second timing boundaries of the write timing window, wherein the memory device recovers the signal on the data bus based on the adjusted phase difference.

15. The system of claim 14, wherein the processing unit is configured to place the memory device in an error detection mode of operation during a write mode of operation.

16. The system of claim 14, wherein the error detection function comprises a parity function or a checksum function.

17. The system of claim 14, wherein, if the first and second results match each other, the processing unit is configured to:

iteratively repeat a sequence to re-transmit the data bits on the data bus, re-determine the second result, and re-compare the first result to the second result for one or more positive incremental phase shifts in the data bits to determine the first timing boundary, wherein the first timing boundary is defined by a last positive incremental phase shift in the data bits in which the first result from the error detection function performed on the positive phase-shifted data bits matches the corresponding second result; and iteratively repeat the sequence to re-transmit the data bits on the data bus, re-determine the second result, and re-compare the first result to the second result for one or more negative incremental phase shifts in the data bits to determine the second timing boundary, wherein the second timing boundary is defined by a last negative incremental phase shift in the data bits in which the first result from the error detection function performed on the negative phase-shifted data bits matches the corresponding second result.

18. The system of claim 14, wherein, if the first and second results match each other, the processing unit is configured to:

iteratively repeat a sequence to re-transmit the data bits on the data bus, re-determine the second result, and re-compare the first result to the second result for one or more positive incremental phase shifts in the write clock signal to determine the first timing boundary, wherein the first timing boundary is defined by a last positive incremental phase shift in the write clock signal in which the first result from the error detection function performed on the data bits matches the corresponding second result; and iteratively repeat the sequence to re-transmit the data bits on the data bus, re-determine the second result, and re-compare the first result to the second result for one or more negative incremental phase shifts in the write clock signal to determine the second timing boundary, wherein the second timing boundary is defined by a last negative incremental phase shift in the write clock signal in which the first result from the error detection function performed on the data bits matches the corresponding second result.

19. The system of claim 14, wherein the processing unit is configured to introduce a phase delay in the signal on the data bus, the write clock signal, or both when adjusting the phase difference between the signal on the data bus and the write clock signal.

20. A system comprising:
a processing unit; and
a memory device coupled to the processing unit and configured to:
perform an error detection function on data bits to generate a first result, wherein the data bits are received at an interface of the memory device based on a write clock signal;
transmit the first result to the processing unit; and
receive a signal on a data bus, wherein a phase difference between the signal on the data bus and the write clock signal is within a write timing window with a first timing boundary and a second timing boundary, the write timing window based on an iterative comparison between the first result and a second result from the error detection function performed on corresponding data bits transferred from the processing unit to the memory device, wherein, between each of the iterative comparisons, a phase shift is introduced into the signal on the data bus when the signal is transferred from the processing device to the memory device, wherein if the first and second results do not match each other,
a sequence to re-perform the error detection function, re-transmit the first result, and re-receive the signal on the data bus is iteratively repeated for one or more positive incremental phase shifts in the corresponding data bits or the write clock signal to determine the first timing boundary defined by a first positive incremental phase shift in the corresponding data bits or the write clock signal in which the second result from the error detection function performed on the positive phase-shifted corresponding data bits matches the corresponding first result, and
starting at the first timing boundary, the sequence to re-perform the error detection function, re-transmit the first result, and re-receive the signal on the data bus is iteratively repeated for another one or more positive incremental phase shifts in the corresponding data bits or the write clock signal to determine the second timing boundary defined by a last positive incremental phase shift in the corresponding data bits or the write clock signal in which the second result from the error detection function performed on the positive phase-shifted corresponding data bits matches the corresponding first result.

21. The system of claim 20, wherein the memory device is configured to operate in an error detection mode of operation.

22. The system of claim 20, wherein the memory device is configured to receive the signal on the data bus that is between the first timing boundary and the second timing boundary of the write timing window.

23. The system of claim 20, wherein the error detection function comprises a parity function or a checksum function.

24. The system of claim 20, wherein, if the first and second results match each other,
a sequence to re-perform the error detection function, re-transmit the first result, and re-receive the signal on the data bus is iteratively repeated for one or more positive incremental phase shifts in the corresponding data bits or the write clock signal to determine the first timing boundary, wherein the first timing boundary is defined by a last positive incremental phase shift in the corresponding data bits or the write clock signal in which the second result from the error detection function performed on the positive phase-shifted corresponding data bits matches the corresponding first result; and the sequence to re-perform the error detection function, re-transmit the first result, and re-receive the signal on the data bus is iteratively repeated for one or more negative incremental phase shifts in the corresponding data bits or the write clock signal to determine the second timing boundary, wherein the second timing boundary is defined by a last negative incremental phase shift in the corresponding data bits in which the second result from the error detection function performed on the negative phase-shifted corresponding data bits matches the corresponding first result.

25. A computer program product comprising a non-transitory machine-usable medium having computer program logic recorded thereon enabling a processor to analyze software code, the computer program logic comprising:

first computer readable program code that enables a processor to determine a first result from an error detection function performed on data bits transferred from a processing device to a memory device;

second computer readable program code that enables a processor to transmit the data bits on a data bus to the memory device;

third computer readable program code that enables a processor to determine a second result from the error detection function performed on corresponding data bits received by the memory device;

fourth computer readable program code that enables a processor to compare the first result to the second result to determine a write timing window with a first timing boundary and a second timing boundary for a signal on the data bus and a write clock signal wherein if the first and second results do not match each other, a sequence of the first, second, third, and fourth computer readable program codes is iteratively repeated for one or more positive incremental phase shifts in the data bits or the write clock signal to determine the first timing boundary defined by a first positive incremental phase shift in the data bits or the write clock signal in which the first result from the error detection function performed on the positive phase-shifted data bits matches the corresponding second result, and starting at the first timing boundary, the sequence of the first, second, third, and fourth computer readable program codes is iteratively repeated for another one or more positive incremental phase shifts in the data bits or the write clock signal to determine the second timing boundary defined by a last positive incremental phase shift in the data, bits or the write clock signal in which the first result from the error detection function performed on the positive phase-shifted data bits matches the corresponding second result; and fifth computer readable program code that enables a processor to adjust a phase difference between the signal on the data bus and the write clock signal based on the first and second timing boundaries of the write timing window, wherein the memory device recovers the signal on the data bus based on the adjusted phase difference.

26. The computer program product of claim 25, wherein, if the first and second results match each other, the fourth computer readable program code comprises:

sixth computer readable program code to enable a processor to iteratively repeat a sequence of the second, third, and fourth computer readable program codes for one or more positive incremental phase shifts in the data bits to determine the first timing boundary, wherein the first timing boundary is defined by a last positive incremental phase shift in the data bits in which the first result from the error detection function performed on the positive phase-shifted data bits matches the corresponding second result; and seventh computer readable program code to enable a processor to iteratively repeat the sequence of the second, third, and fourth, and fifth computer readable program codes for one or more negative incremental phase shifts in the data bits to determine the second timing boundary, wherein the second timing boundary is defined by a last negative incremental phase shift in the data bits in which the first result from the error detection function performed on the negative phase-shifted data bits matches the corresponding second result.

27. The computer program product of claim 25, wherein, if the first and second results match each other, the fourth computer readable program code comprises:

sixth computer readable program code to enable a processor to iteratively repeat a sequence of the second, third, and fourth computer readable program codes for one or more positive incremental phase shifts in the write clock signal to determine the first timing boundary, wherein the first timing boundary is defined by a last positive incremental phase shift in the write clock signal in which the first result from the error detection function performed on the data bits matches the corresponding second result; and seventh computer readable program code to enable a processor to iteratively repeat the sequence of the second, third, and fourth computer readable program codes for one or more negative incremental phase shifts in the write clock signal to determine the second timing boundary, wherein the second timing boundary is defined by a last negative incremental phase shift in the write clock signal in which the first result from the error detection function performed on the data bits matches the corresponding second result.

* * * * *